United States Patent
Wang et al.

(10) Patent No.: US 11,843,672 B2
(45) Date of Patent: Dec. 12, 2023

(54) PRIVACY PRESERVING CENTROID MODELS USING SECURE MULTI-PARTY COMPUTATION

(71) Applicant: GOOGLE LLC, Mountain View, CA (US)

(72) Inventors: Gang Wang, Jersey City, NJ (US); Marcel M. Moti Yung, New York, NY (US)

(73) Assignee: Google LLC, Mountain View, CA (US)

( * ) Notice: Subject to any disclaimer, the term of this patent is extended or adjusted under 35 U.S.C. 154(b) by 6 days.

(21) Appl. No.: 17/775,994

(22) PCT Filed: Sep. 16, 2021

(86) PCT No.: PCT/US2021/050580
§ 371 (c)(1),
(2) Date: May 11, 2022

(87) PCT Pub. No.: WO2022/072146
PCT Pub. Date: Apr. 7, 2022

(65) Prior Publication Data
US 2022/0394102 A1 Dec. 8, 2022

(30) Foreign Application Priority Data
Oct. 2, 2020 (IL) .......................... 277760

(51) Int. Cl.
*G06F 15/16* (2006.01)
*H04L 67/306* (2022.01)
*H04L 9/08* (2006.01)

(52) U.S. Cl.
CPC ............ *H04L 67/306* (2013.01); *H04L 9/085* (2013.01); *H04L 9/0869* (2013.01); *H04L 2209/46* (2013.01)

(58) Field of Classification Search
CPC ..... H04L 67/306; H04L 9/085; H04L 9/0869; H04L 2209/46
(Continued)

(56) References Cited

U.S. PATENT DOCUMENTS 10,394,913 B1 * 8/2019 Chaoji .............. G06F 18/23213
11,132,721 B1 * 9/2021 Uthaman .............. G06F 16/958
(Continued)

FOREIGN PATENT DOCUMENTS

| JP | 2009-511937 | 3/2009 |
| JP | 2013-069279 | 4/2013 |
| JP | 2013-178640 | 9/2013 |

OTHER PUBLICATIONS

Don Marti, "Support_for_advertising_use_cases.md" submitted on Apr. 14, 2020, <https://github.com/w3c/web-advertising/blob/main/support_for_advertising_use_cases.md#lookalike-targeting>, 44 pages.
(Continued)

*Primary Examiner* — Alan S Chou
(74) *Attorney, Agent, or Firm* — Fish & Richardson P.C.

(57) ABSTRACT

This disclosure relates to a privacy preserving machine learning platform. In one aspect, a method includes receiving, from a client device and by a computing system of multiple multi-party computation (MPC) systems, a first request for user group identifiers that identify user groups to which to add a user. The first request includes a model identifier for a centroid model, first user profile data for a user profile of the user, and a threshold distance. For each user group in a set of user groups corresponding to the model identifier, a centroid for the user group that is determined using a centroid model corresponding to the model identifier is identified. The computing system determines a user group result based at least on the first user profile data, the
(Continued)

centroids, and the threshold distance. The user group result is indicative of user group(s) to which to add the user.

20 Claims, 8 Drawing Sheets

(58) Field of Classification Search
USPC .......................................................... 709/203
See application file for complete search history.

(56) References Cited

U.S. PATENT DOCUMENTS

| | | | |
|---|---|---|---|
| 2010/0017870 A1* | 1/2010 | Kargupta | H04L 63/1408 |
| | | | 709/201 |
| 2016/0147758 A1 | 5/2016 | Chhaya et al. | |
| 2016/0378776 A1 | 12/2016 | Green et al. | |
| 2017/0308792 A1* | 10/2017 | Liang | G06Q 10/02 |
| 2020/0005180 A1 | 1/2020 | Fritchman et al. | |
| 2021/0133587 A1* | 5/2021 | Mohassel | G06N 7/01 |
| 2022/0057519 A1* | 2/2022 | Goldstein | G01S 17/04 |

OTHER PUBLICATIONS

International Search Report and Written Opinion in International Appln. No. PCT/US2021/050580, dated Jan. 20, 2022, 15 pages.

Marco Scaceres "Trust-Token-API" submitted on Oct. 3, 2019, <https://github.com/WICG/trust-token-api>, 13 pages.

Wikipedia.org [online], "Commitment scheme" May 16, 2020, retrieved on Jun. 11, 2020, retrieved from URL <https://en.wikipedia.org/wiki/Commitment_scheme>, 9 pages.

Wikipedia.org [online], "Curve25519" Jun. 11, 2020, retrieved on Jun. 11, 2020, retrieved from URL <https://en.wikipedia.org/wiki/Curve25519>, 7 pages.

Wikipedia.org [online], "HMAC" Jun. 1, 2020, retrieved on Jun. 11, 2020, retrieved from URL <https://en.wikipedia.org/wiki/HMAC>, 6 pages.

Wikipedia.org [online], "Private information retrieval" May 11, 2020, retrieved on Jun. 11, 2020, retrieved from URL <https://en.wikipedia.org/wiki/Private_information_retrieval>, 6 pages.

Wikipedia.org [online], "Secure multi-party computation" May 2, 2020, retrieved on Jun. 11, 2020, retrieved from URL <https://en.wikipedia.org/wiki/Secure_multi-party_computation>, 12 pages.

International Preliminary Report on Patentability in International Appln. No. PCT/US2021/050580, dated Apr. 13, 2023, 10 pages.

Notice of Allowance in European Appln. No. 21789968.1, dated Feb. 3, 2023, 9 pages.

Office Action in Israel Appln. No. 277760, dated May 30, 2023, 4 pages.

Office Action in Japanese Appln. No. 2022-535186, dated Aug. 7, 2023, 5 pages (with English translation).

* cited by examiner

PRIVACY PRESERVING CENTROID MODELS USING SECURE MULTI-PARTY COMPUTATION

CROSS-REFERENCE TO RELATED APPLICATION

This application is a National Stage Application under 35 U.S.C. § 371 and claims the benefit of International Application No. PCT/US2021/050580, filed Sep. 16, 2021, which claims priority to IL Application No. 277760, filed Oct. 2, 2020. The entire contents of the foregoing applications are hereby incorporated by reference in their entirety.

BACKGROUND

This specification relates to a privacy preserving machine learning platform that trains and uses machine learning models using secure multi-party computation.

Some machine learning models are trained based on data collected from multiple sources, e.g., across multiple websites and/or native applications. However, this data may include private or sensitive data that should not be shared or allowed to leak to other parties.

SUMMARY

In general, one innovative aspect of the subject matter described in this specification can be embodied in methods that include receiving, from a client device and by a first computing system of multiple multi-party computation (MPC) systems, a first request for user group identifiers that identify user groups to which to add a user, the first request includes a model identifier for a centroid model, first user profile data for a user profile of the user, and a threshold distance; identifying a set of user groups corresponding to the model identifier; identifying, for each user group in the set of user groups, a centroid for the user group determined using a centroid model corresponding to the model identifier; determining, by the first computing system, a user group result based at least on the first user profile data, the centroid for each user group in the set of user groups, and the threshold distance, wherein the user group result is indicative of one or more user groups to which to add the user; and transmitting the user group result to the client device. Other implementations of this aspect include corresponding apparatus, systems, and computer programs, configured to perform the aspects of the methods, encoded on computer storage devices.

These and other implementations can each optionally include one or more of the following features. In some aspects, the first user profile data includes a first portion of the user profile and wherein the centroid for each user group is determined using a secure MPC process between the first computing system and one or more second computing systems of the MPC systems. The user group result can include the one or more user group identifiers of the one or more user groups. Each second computing system can transmit, to the client device, a second user group result that includes one or more second user group identifiers of one of one or more second user groups to which to add the user determined based on a respective second portion of the user profile, a respective second centroid for each user group in the set of user groups, and the threshold distance.

Some aspects can include generating the centroid for each user group in the set of user groups. This generating can include obtaining a data structure that includes, for each centroid model and user group identifier pair, a first sum of shares vector representing a sum of first shares of a set of user profiles and a number of client devices from which the first shares of the set of user profiles was received. The generating can also include determining, for each centroid model and user group identifier pair, whether the number of applications satisfies the threshold; for each centroid model and user group identifier pair for which the number of applications satisfies the threshold, transmitting a first portion of the first sum of shares vector for the centroid model and user group identifier pair to each of one or more second computing systems of the MPC systems; receiving, from each of the one or more second computing systems a portion of a respective second sum of shares vector for one or more centroid model and user group identifier pairs; for each of the one or more centroid model and user group identifier pairs: determining a sum of each portion of the respective second sum of shares vector for the centroid model and user group identifier pair and a portion of the first sum of shares vector for the centroid model and user group identifier pair; and determining the centroid of a user group identifier by the user group identifier based on the sum.

In some aspects, determining the centroid of a user group identified by the user group identifier based on the sum includes dividing the sum by a sum of (i) the number of client devices for the centroid model and user group identifier pair and (ii) a respective number of client devices for the centroid model and user group identifier pair received from each second computing system.

In some aspects, the first user profile data for the user profile includes a first secret share of the user profile. For each centroid model and user group identifier pair, a determination is made, based on a random or pseudorandom seed received from the client device, a first number having a value of zero or one and that represents a first secret share of an estimate by an application of the client device of whether the user is to be added to the user group identified by the user group identifier. A first secret share of an estimation flag indicating whether the application estimated whether the user is to be added to the user group correctly is derived by performing a first round of secure MPC process with one or more second computing systems of the MPC systems using at least the first secret share of the user profile, the first number, a respective second secret share of the user profile received by each second computing system, and a respective second number received by each second computing system. Some aspects can include performing a second round of the secure MPC process with the one or more second computing systems to reconstruct the estimation flag based on the first secret share of the estimation flag and a respective second secret share of the estimation flag derived by each of the one or more second computing systems. The user group result can include the estimation flag for each centroid model and user group identifier pair. Some aspects can include receiving a first request for one or more user group identifiers corresponding to one or more of the estimation flags. The request can include a distributed point function for each estimation flag. Some aspects can include deriving a first user group identifier result for each estimation flag using the user group identifier corresponding to the estimation flag and the distributed point function for the estimation flag. The client device can determine the user group identifier corresponding to the estimation flag using the first user group identifier result and a respective second user group identifier result received from each second computing system of the MPC systems.

The subject matter described in this specification can be implemented in particular embodiments so as to realize one or more of the following advantages. The techniques described in this document can identify users that have similar interests and expand user group membership while preserving the privacy and data security of users, e.g., without the need to send users' online activity data to content platforms or otherwise leak the users' online activity data to any computing systems or parties. This protects user privacy with respect to such platforms and preserves the security of the data from breaches during transmission or from the platforms. Historically, third party cookies (i.e., cookies from a different domain than the resource being rendered by a client device) have been used to collect data from client devices across the Internet. However, some browsers are blocking the use of third party cookies, thereby preventing the collection of data using third party cookies. This creates a problem when attempting to utilize collected data to segment data, make inferences, or otherwise utilize data to enhance online browsing experiences. In other words, without the use of third party cookies, much of the data previously collected is no longer available, which prevents computing systems from being able to use that data. Beneficially therefore, the subject matter described herein allows the aggregation of data relating to different users, without compromising user data security or privacy, and without requiring third party cookies.

Cryptographic techniques, such as secure multi-party computation (MPC), can be used to solve the problems that arise when third party cookies are not able to be used to collect data. For example, cryptographic techniques enable the expansion of user groups based on similarities in user profiles without the use of third-party cookies, which preserves user privacy without negatively impacting the ability to expand the user groups and in some cases provides better user group expansion based on more complete profiles than achievable using third-party cookies. The MPC techniques can ensure that, as long as one of the computing systems in an MPC cluster does not reveal its portion of the underlying data in plaintext, no user data can be obtained by any of the computing systems or another party in plaintext. As such, the claimed methods allow the identification, grouping and transmission of user data in a secure manner, without requiring the use of third-party cookies to determine any relations between user data. This is a distinct approach from previous, known methods which generally require plaintext user profiles often collected by third-party cookies to determine relationships between data. By grouping user data in this manner, the efficiency of transmitting data content to user devices is improved as data content that is not relevant to a particular user need not be transmitted. Particularly, third-party cookies are not required thereby avoiding the storage of third-party cookies, improving memory usage. Exponential decay techniques can be used to build user profiles at client devices to reduce the data size of the raw data needed to build the user profiles, thereby reducing data storage requirements.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, this document describes systems and techniques for expanding user group membership while preserving user privacy and ensuring data security, even in situations where third party cookies are blocked (e.g., by browsers), and/or collection of user profiles is infeasible due to a variety of reasons. In general, rather than creating and maintaining user profiles at computing systems of other entities, such as content platforms, the user profiles are maintained at the client devices of the users. To generate the machine learning models that can be used to expand group membership, the client devices of the users can send their encrypted user profiles (e.g., as secret shares of the user profiles) along with other data to multiple computing systems of a secure multi-party computation (MPC) cluster, optionally via a content platform. For example, each client device can generate two or more secret shares of the user profile and send a respective secret share to each computing system. In some implementations, the different subsets of the information in each user profile is provided to each computing system such that there is no overlap in the user profile data that is sent to each computing system.

The computing systems of the MPC cluster can use MPC techniques to generate machine learning models for suggesting user groups for the users based on their profiles in ways that prevent any computing system of the MPC cluster (or other party which is not the user itself) from obtaining any individual user's profile in plaintext, thereby preserving user privacy. The machine learning models can be centroid models. In this example, a centroid model for a user group can represent the center of the user profile, e.g., a center (average) of the user profiles for the users that are members of the user group.

After the machine learning models are generated, the machine learning models can be used to suggest one or more user groups for each user based on their profiles. For example, the client device of a user can query the MPC cluster for suggested user groups for that user or to determine whether a user should be added to a particular user group. The MPC cluster can use the user profile of the user to identify user groups having a centroid that is within a threshold distance of the user profile of the user. The user group membership of a user can be used in privacy preserving and secure ways to provide content to the user.

Example System for Generating and Using Machine Learning Models

Figure 1:
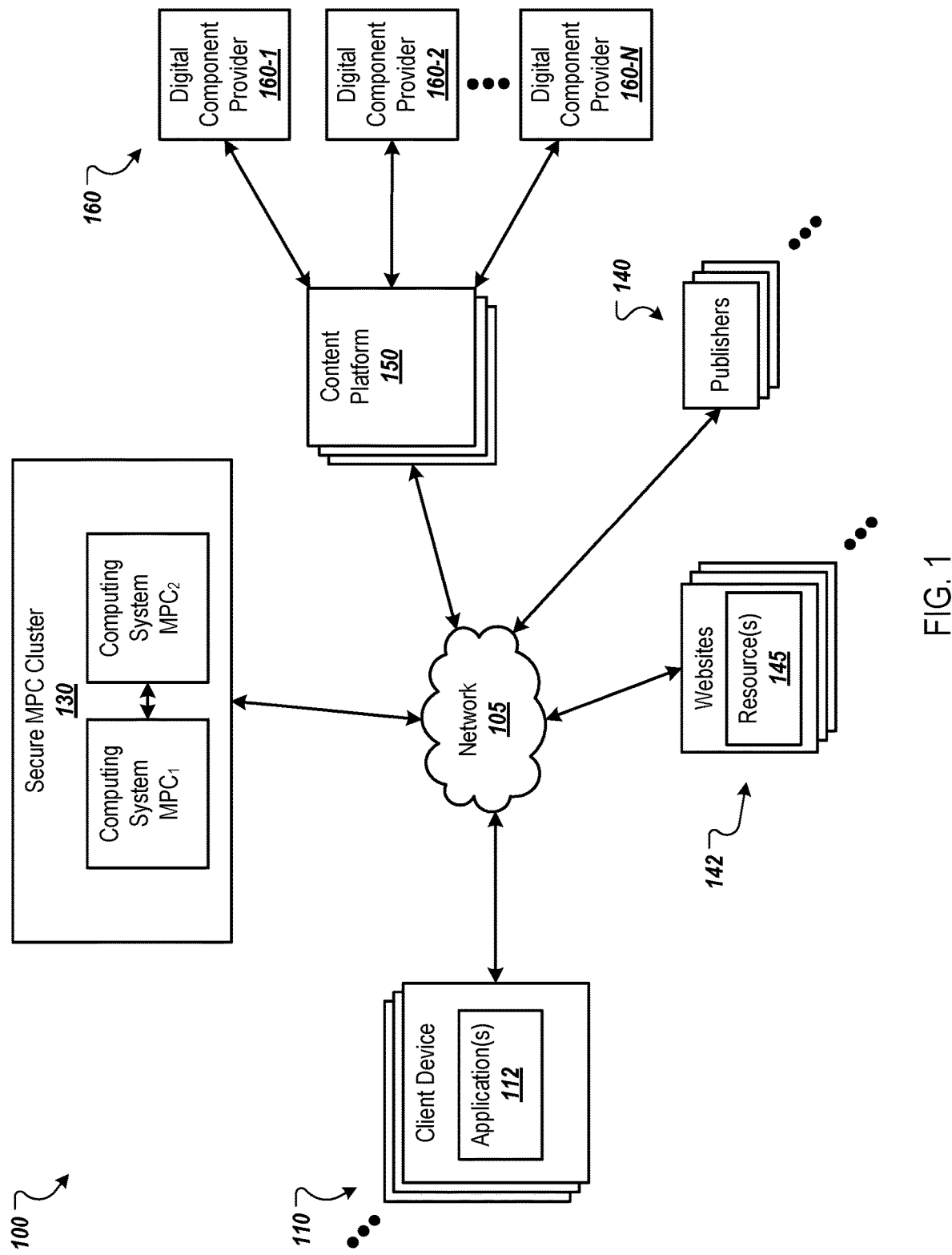
FIG. 1 is a block diagram of an environment in which a secure MPC cluster generates machine learning models and the machine learning models are used to expand user groups.

FIG. 1 is a block diagram of an environment 100 in which a secure MPC 130 cluster generates machine learning models and the machine learning models are used to expand user groups. The example environment 100 includes a data communication network 105, such as a local area network (LAN), a wide area network (WAN), the Internet, a mobile network, or a combination thereof. The network 105 connects the client devices 110, the secure MPC cluster 130, publishers 140, websites 142, and content platforms 150. The example environment 100 may include many different client devices 110, secure MPC clusters 130, publishers 140, websites 142, and content platforms 150.

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television.

A client device 110 typically includes applications 112, such as web browsers and/or native applications, to facilitate the sending and receiving of data over the network 105. A native application is an application developed for a particular platform or a particular device (e.g., mobile devices having a particular operating system). Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

Some resources, application pages, or other application content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource (or application content) that includes one or more digital component slots, the application 112 can request a digital component for each slot. In some implementations, the digital component slot can include code (e.g., scripts) that cause the application 112 to request a digital component from a digital component distribution system that selects a digital component and provides the digital component to the application 112 for presentation to a user of the client device 110.

The content platforms 150 can include supply-side platforms (SSPs) and demand-side platforms (DSPs). In general, the content platforms 150 manage the selection and distribution of digital components on behalf of publishers 140 and digital component providers 160.

Some publishers 140 use an SSP to manage the process of obtaining digital components for digital component slots of its resources and/or applications. An SSP is a technology platform implemented in hardware and/or software that automates the process of obtaining digital components for the resources and/or applications. Each publisher 140 can have a corresponding SSP or, in some rare cases, multiple SSPs. Some publishers 140 may use the same SSP.

Digital component providers 160 can create (or otherwise publish) digital components that are presented in digital component slots of publisher's resources and applications. The digital component providers 160 can use a DSP to manage the provisioning of its digital components for presentation in digital component slots. A DSP is a technology platform implemented in hardware and/or software that automates the process of distributing digital components for presentation with the resources and/or applications. A DSP can interact with multiple supply-side platforms SSPs on behalf of digital component providers 160 to provide digital components for presentation with the resources and/or applications of multiple different publishers 140. In general, a DSP can receive requests for digital components (e.g., from an SSP), generate (or select) a selection parameter for one or more digital components created by one or more digital component providers based on the request, and provide data related to the digital component (e.g., the digital component itself) and the selection parameter to an SSP. The SSP can then select a digital component for presentation at a client device 110 and provide, to the client device 110, data that causes the client device 110 to present the digital component.

In some cases, it is beneficial to a user to receive digital components related to web pages, application pages, or other electronic resources previously visited and/or interacted with by the user. In order to distribute such digital components to users, the users can be assigned to user groups, e.g., user interest groups, cohorts of similar users, or other group types involving similar user data, when the users visit particular resources or perform particular actions at the resource (e.g., interact with a particular item presented on a web page or add the item to a virtual cart). The user groups can be generated by the digital component providers 160. That is, each digital component provider 160 can assign users to their user groups when the users visit electronic resources of the digital component providers 160.

To protect user privacy, a user's group membership can be maintained at the user's client device 110, e.g., by one of the applications 112, or the operating system of the client device 110, rather than by a digital component provider, content platform, or other party. In a particular example, a trusted program (e.g., a web browser or the operating system can maintain a list of user group identifiers ("user group list") for a user using the web browser or another application. The user group list can include a group identifier for each user group to which the user has been added. The digital component providers 160 that create the user groups can specify the user group identifiers for their user groups. The user group identifier for a user group can be descriptive of the group (e.g., gardening group) or a code that represents the group (e.g., an alphanumeric sequence that is not descriptive). The user group list for a user can be stored in secure storage at the client device 110 and/or can be encrypted when stored to prevent others from accessing the list.

When the application 112 presents a resource or application content related to a digital component provider 160, or a web page on a website 142, the resource can request that the application 112 add one or more user group identifiers to the user group list. In response, the application 112 can add the one or more user group identifiers to the user group list and store the user group list securely.

The content platforms 150 can use the user group membership of a user to select digital components or other content that may be of interest to the user or may be beneficial to the user/user device in another way. For example, such digital components or other content may include data that improves a user experience, improves the running of a user device or benefits the user or user device in some other way. However, the user group identifiers of the user group list of a user can be provided in ways that prevent the content platforms 150 from correlating user group identifiers with particular users, thereby preserving user privacy and data security when using user group membership data to select digital components.

The application 112 can provide user group identifiers from the user group list to a trusted computing system that interacts with the content platforms 150 to select digital components for presentation at the client device 110 based on the user group membership in ways that prevent the content platforms 150 or any other entities which are not the user itself from knowing a user's user group membership.

In some cases, it is beneficial to users and to digital component providers to expand user groups to include users that have similar interests or other similar data as the users that are already members of the user group. Usefully, this may be achieved without the use of third-party cookies. For example, a first user may be interested in snow skiing and may be a member of a user group for a particular ski resort. A second user may also be interested in skiing, but unaware of this ski resort and not a member of the ski resort. If the two users have similar interests or data, e.g., similar user profiles, the second user may be added to the user group for the ski resort so that the second user receives content, e.g., digital components, related to the ski resort and that may be of interest or otherwise beneficial to the second user or a user device thereof. In other words, user groups may be expanded to include other users having similar user data.

The secure MPC cluster 130 can generate, e.g., train, machine learning models that suggest, or can be used to generate suggestions of, user groups to users (or their applications 112) based on the user's profiles. The secure MPC cluster 130 includes two computing systems $MPC_1$ and $MPC_2$ that perform secure MPC techniques to generate the machine learning models. Although the example MPC cluster 130 includes two computing systems, more computing systems can also be used to perform the MPC process as long as the MPC cluster 130 includes more than one computing system. For example, the MPC cluster 130 can include three computing systems, four computing systems, or another appropriate number of computing systems. Using more computing systems in the MPC cluster 130 can provide more security and fault tolerance, but can also increase the complexity of the MPC processes.

The computing systems of the MPC cluster 130, e.g., computing systems $MPC_1$ and $MPC_2$, can be operated by different entities. In this way, each entity may not have access to the complete user profiles in plaintext. Plaintext is text that is not computationally tagged, specially formatted, or written in code, or data, including binary files, in a form that can be viewed or used without requiring a key or other decryption device, or other decryption process. For example, one of the computing systems $MPC_1$ or $MPC_2$ can be operated by a trusted party different from the users, the publishers 140, the content platform 150, and the digital component providers 160. For example, an industry group, governmental group, or browser developer may maintain and operate one of the computing systems $MPC_1$ and $MPC_2$. The other computing system may be operated by a different one of these groups, such that a different trusted party operates each computing system $MPC_1$ and $MPC_2$. Preferably, the different parties operating the different computing systems $MPC_1$ and $MPC_2$ have no incentive to collude to endanger user privacy. In some implementations, the computing systems $MPC_1$ and $MPC_2$ are separated architecturally and are monitored to not communicate with each other outside of performing the secure MPC processes described in this document.

Figure 4:
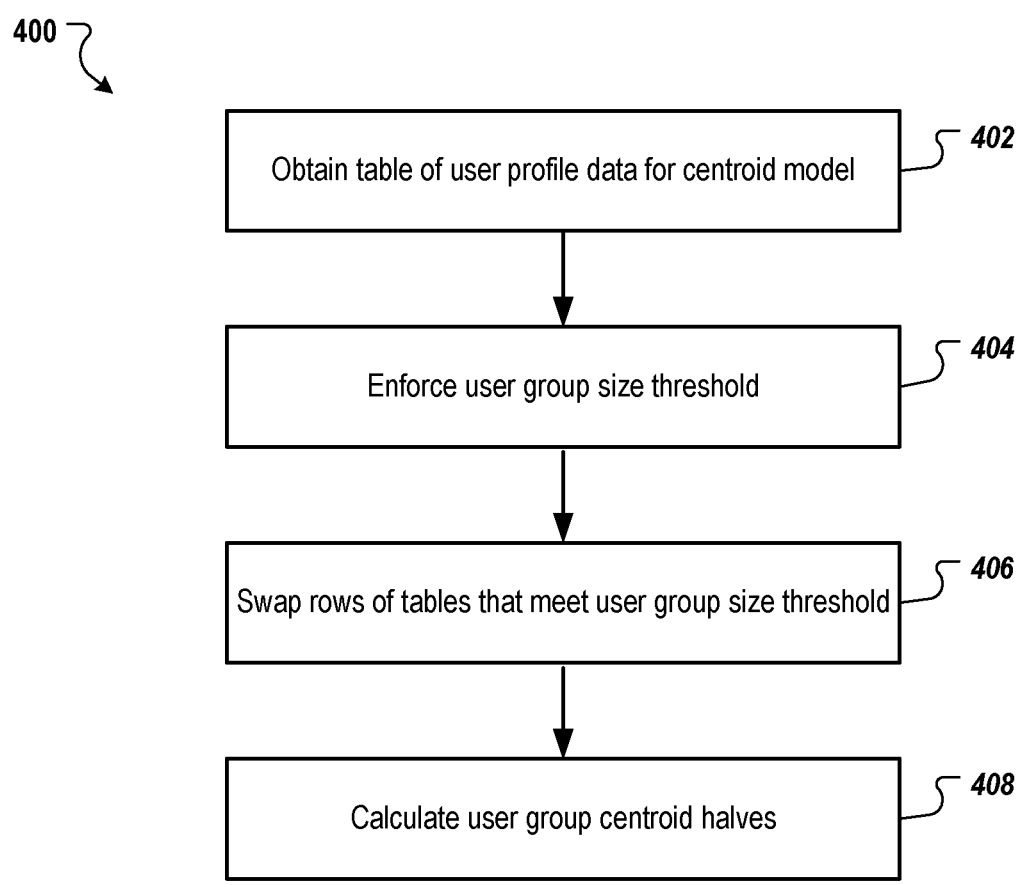
FIG. 4 is a flow diagram that illustrates an example process for generating centroid models.
Figure 6:
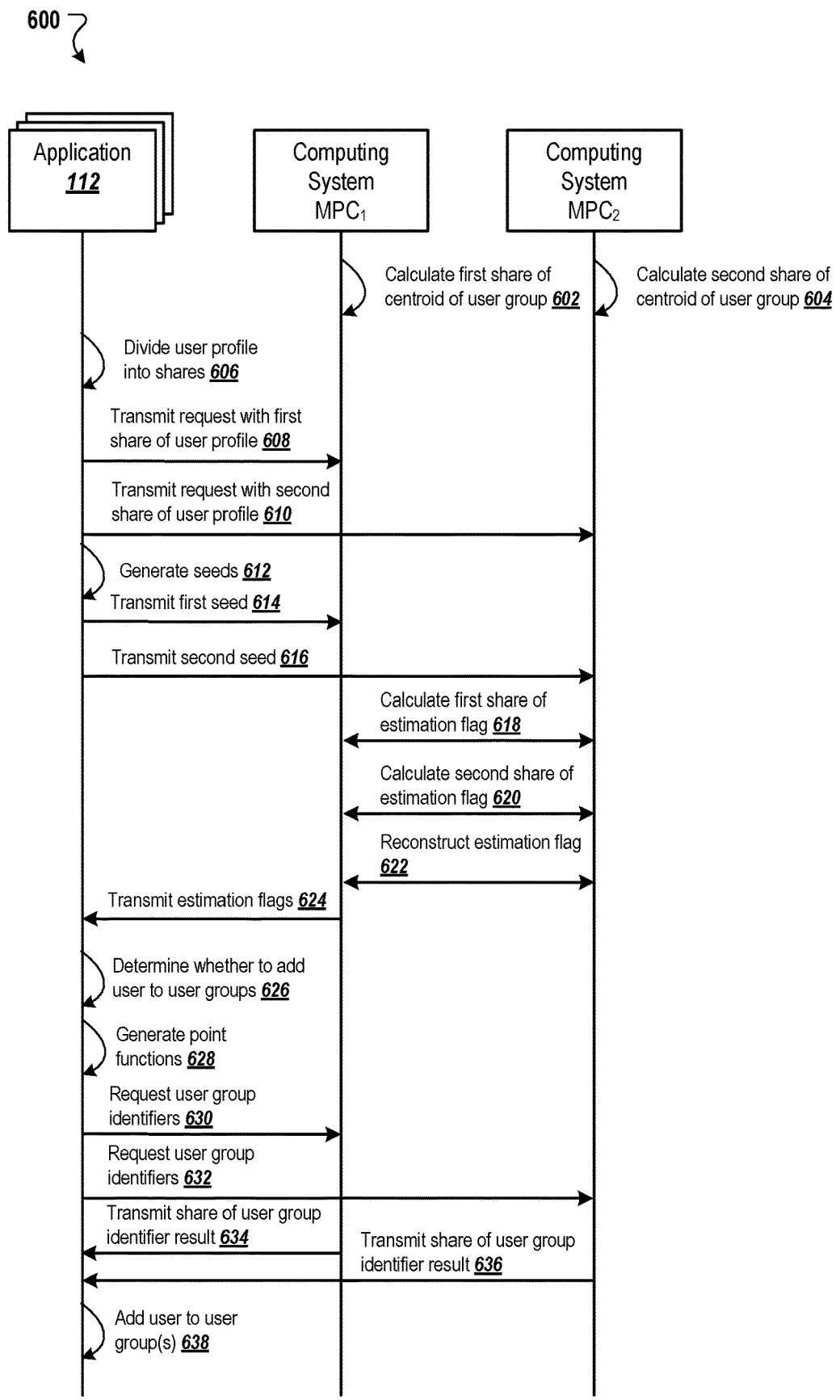
FIG. 6 is a swim lane diagram that illustrates an example process for generating a centroid model and using the centroid model to add a user to a user group corresponding to the centroid model.

In some implementations, the MPC cluster 130 generates, e.g., trains, one or more centroid models for each content platform 150 (e.g., each DSP and/or each SSP) and/or for each digital component provider 160. For example, a content platform 150 can have the MPC cluster 130 generate a centroid model for any subset of one or more user groups managed by the content platform 150 or for which the content platform has at least read access. For example, each content platform 150 can manage the distribution of digital components for one or more digital component providers 160. A content platform 150 can request that the MPC cluster 130 generate a centroid model for one or more of the digital component providers 160 for which the content platform 150 manages the distribution of digital components. In another example, a digital component provider 160 can have the MPC cluster 130 generate a centroid model for one or more of the user groups created by and maintained by the digital component provider 160. Example processes for generating centroid models are illustrated in FIGS. 4 and 6 and described below.

A centroid model can embed users into an n-dimensional space. A user in the profile space is represented by a n-dimensional vector, $X=\{x_1, x_2, \ldots x_n\}$. A user group R has m users: $\{X_1, X_2, \ldots X_m\}$. The centroid of user group R in the model can be $$\text{Centroid (model, } R) = \frac{1}{m} \times \Sigma_{i=1}^{m} X_i.$$

Given a user $X'=\{x_1', x_2', \ldots x_n'\}$, a content platform 150 or digital component provider 160 may want to find all user groups R such that $|X'-\text{Centroid(model, }R)|<d$, where d is a parameter that represents a threshold distance for the centroid model, e.g., specified by the content platform 150.

For ease of subsequent description and brevity, the remaining description is largely in terms of generating and using centroid models for content platforms 150, e.g., DSPs and SSPs. However, the systems and techniques can also be performed for generating centroid models for digital component providers 160 or other entities and querying the centroid models on behalf of the digital component providers 160 or other entities.

After generating a centroid model for a content platform 150, the content platform 150 can query, or have the application 112 of a client device 110 query one or more centroid models to identify one or more user groups for a user of the client device 110 to join. For example, the content platform 150 can request that the application 112 query the centroid model(s) of the content platform to determine if the user should join any of the user groups of the content platform 150. In general, the MPC cluster 130 can determine whether the user profile of the user is within a threshold distance of the centroids of the user groups of the content platform 150. If so, the MPC cluster 130 can request that the application 112 add the user to the user groups for which the user profile is within the threshold distance of the centroid. If approved by the user and/or the application 112, the application 112 can add a user group identifier for the user group to the user group list stored at the client device 110.

In some implementations, an application 112 can provide a user interface that enables a user to manage the user groups to which the user is assigned. For example, the user interface can enable the user to remove user group identifiers, prevent all or particular resources 145, publishers 140, content platforms 150, digital component providers 160, and/or MPC clusters 130 from adding the user to a user group (e.g., prevent the entity from adding user group identifiers to the list of user group identifiers maintained by the application 112). This provides better transparency, choice/consent and control for the user.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Example Process for Generating and Using Machine Learning Models

Figure 2:
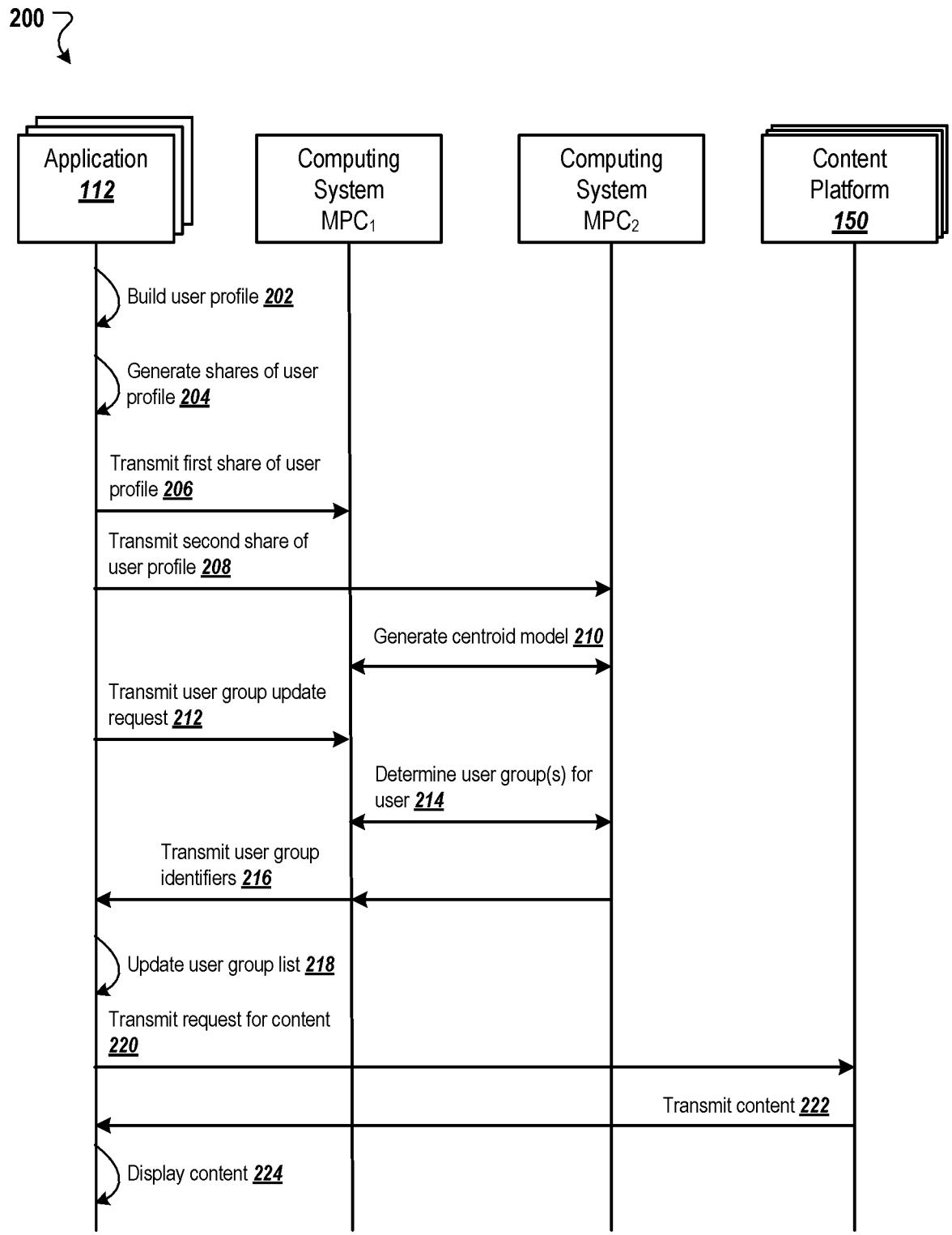
FIG. 2 is a swim lane diagram of an example process for generating a centroid model and using the centroid model to add users to user groups.

FIG. 2 is a swim lane diagram of an example process 200 for generating a centroid model and using the centroid model to add users to user groups. Operations of the process 200 can be implemented, for example, by the client device 110, the computing systems $MPC_1$ and $MPC_2$ of the MPC cluster 130, and a content platform 150. Operations of the process 200 can also be implemented as instructions stored on one or more computer readable media which may be non-transitory, and execution of the instructions by one or more data processing apparatus can cause the one or more data processing apparatus to perform the operations of the process 200. Although the process 200 and other processes below are described in terms of a two computing system MPC cluster 130, MPC clusters having more than two computing systems can also be used to perform similar processes.

A content platform 150 can initiate the generating and/or updating of one or more of its centroid models by requesting that applications 112 running on client devices 110 generate a user profile for their respective users and upload secret-shared and/or encrypted versions of the user profiles to the MPC cluster 130. For the purposes of this document, secret shares of user profiles can be considered encrypted versions of the user profiles as the secret shares are not in plaintext. In generation, each application 112 can store data for a user profile and generate the updated user profile in response to receiving a request from the content platform 150. As the content of a user profile and the machine learning models differ for different content platforms 150, the application 112 running on a user's client device 110 can maintain data for multiple user profiles and generate multiple user profiles that are each specific to particular content platforms, or specific to particular centroid models.

As a content platform 150 (or digital component provider 160) can have multiple centroid models, e.g., one for each set of one or more user groups, the content platform 150 (or digital component provider 160) can request the application 112 to generate the user profile and upload the user profile for multiple user groups and/or multiple centroid models at the same time, e.g. with a single request.

An application 112 running on a client device 110 builds a user profile for a user of the client device 110 (202). The user profile for a user can include data related to events initiated by the user and/or events that could have been initiated by the user with respect to electronic resources, e.g., web pages or application content. The events can include views of electronic resources, views of digital components, user interactions, or the lack of user interactions with (e.g., selections of) electronic resources or digital components, conversions that occur (or do not occur) after user interaction with electronic resources, and/or other appropriate events related to the user and electronic resources. As the user profile can change over time, the built user profile can be referred to as a current user profile $P_{current}$.

A user profile for a user can be specific to a content platform 150, or selected centroid models owned by the content platform 150. For example, as described in more detail below with reference to FIG. 3, each content platform 150 can request that the application 112 generate or update a user profile specific to that content platform 150. In another example, the content platform 150 can request that the application generate or update a respective user profile for each centroid model of the content platform 150.

Figure 3:
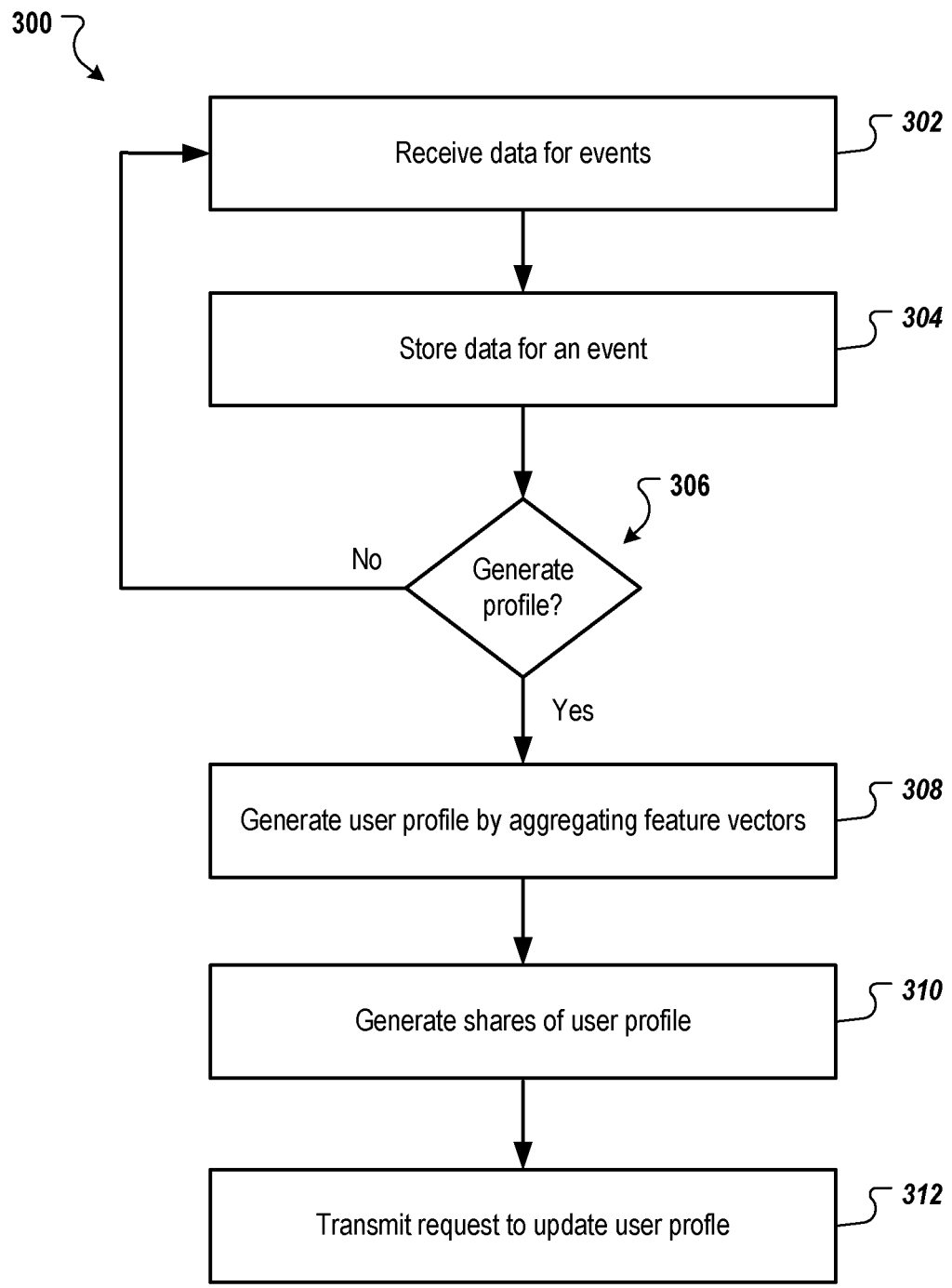
FIG. 3 is a flow diagram that illustrates an example process for generating a user profile and sending the user profile to an MPC cluster.

The user profile $P_{current}$ for a user can be in the form of a feature vector. For example, the user profile $P_{current}$ can be an n-dimensional feature vector. Each of the n dimensions can correspond to a particular feature and the value of each dimension can be the value of the feature for the user. For example, one dimension may be for whether a particular digital component was presented to (or interacted with by) the user. In this example, the value for that feature could be "1" if the digital component was presented to (or interacted with by) the user or "0" if the digital component has not been presented to (or interacted with by) the user. An example process for generating a user profile for a user is illustrated in FIG. 3 and described below.

The application 112 generates secret shares of the user profile $P_{current}$ for the user (204). In this example, the application 112 generates two secret shares $[P_{current, 1}]$ and $[P_{current, 2}]$ of the user profile $P_{current}$, one for each computing system of the MPC cluster 130. For the purposes of this document, secret shares are represented using brackets [ ] around the element (e.g., value, vector, etc.) that is secret shared, e.g., [secret share], for a secret share of a element "secret share." For example, the application can split the user profile $P_{current}$ into secret shares to protect the value of the user profile $P_{current}$ from a compromised computing system in the MPC cluster 130. Note that each secret share by itself can be a random value that by itself does not reveal anything about the user profile. Both secret shares would need to be combined to get the user profile. If the MPC cluster 130 includes more computing systems that participate in the training of a machine learning model, the application 112 would generate more secret shares, one for each computing system. An example process for building a user profile and generating secret shares of a user profile is illustrated in FIG. 3 and described below.

The application 112 provides the first secret share $[P_{current, 1}]$ of the user profile $P_{current}$ to computing system $MPC_1$ (206). The application 112 also provides the second secret share $[P_{current, 2}]$ of the user profile to computing system $MPC_2$ (208). As described below with reference to FIG. 3, there are various ways to provide the two secret shares $[P_{current, 1}]$ and $[P_{current, 2}]$ of the user profile $P_{current}$ to the MPC cluster 130 such that user privacy and the security of the data is protected.

The computing systems $MPC_1$ and $MPC_2$ generate a centroid model (210). The computing systems $MPC_1$ and $MPC_2$ can generate a centroid model for multiple user groups of the content platform 150 or digital component provider 160 that requested the client device 110 to upload the user profile. Each time a new machine learning model is generated based on user profile data can be referred to as a training session. The computing systems $MPC_1$ and $MPC_2$ can generate a centroid model based on the secret shares of the user profiles received from multiple client devices. For example, the computing systems $MPC_1$ and $MPC_2$ can use MPC techniques to generate a centroid model based on the secret shares of the user profiles. In general, generating the centroid model for a user group includes calculating the centroid of the user profiles of the users that are members of the user group. Example processes for generating centroid models are illustrated in FIGS. 4 and 6 and described below.

Each centroid model generated by and maintained by the MPC cluster 130 can have a corresponding unique identifier. This enables the application 112 to query the centroid models using the model identifiers. For example, a request to generate a centroid model can include the model identifier for the centroid model, which may be assigned by the owner (e.g., content platform 150 or digital component provider 160). The owner can then use the model identifier to request applications 112 to query the centroid model to determine whether to add users to the user group corresponding to the centroid model.

The application 112 submits a user group update request to the MPC cluster 130 (212). The user group update request can include the current user profile $P_{current}$ of the user. In some implementations, the application 112 can send the complete user profile $P_{current}$ to each computing system $MPC_1$ and $MPC_2$. In other implementations, to protect user privacy, the application 112 can send a respective portion or a secret share of the user profile $P_{current}$ to each computing system $MPC_1$ and $MPC_2$.

The user group update request can also include the model identifier for each of one or more centroid models to be queried to determine whether the user should be added to the user group corresponding to the centroid model. In some implementations, the application 112 sends a separate user group update request for each centroid model. In this example, each user group request includes the model identifier for the one centroid model.

Each user group update request can also include the threshold distance, e.g., maximum distance, for the query. If the user profile of the user is within the threshold distance of the centroid for a user group, the MPC cluster 130 can request that the application 112 add the user to the user group corresponding. Example data formats and techniques for transmitting a user group update request are described with reference to FIG. 5.

Figure 5:
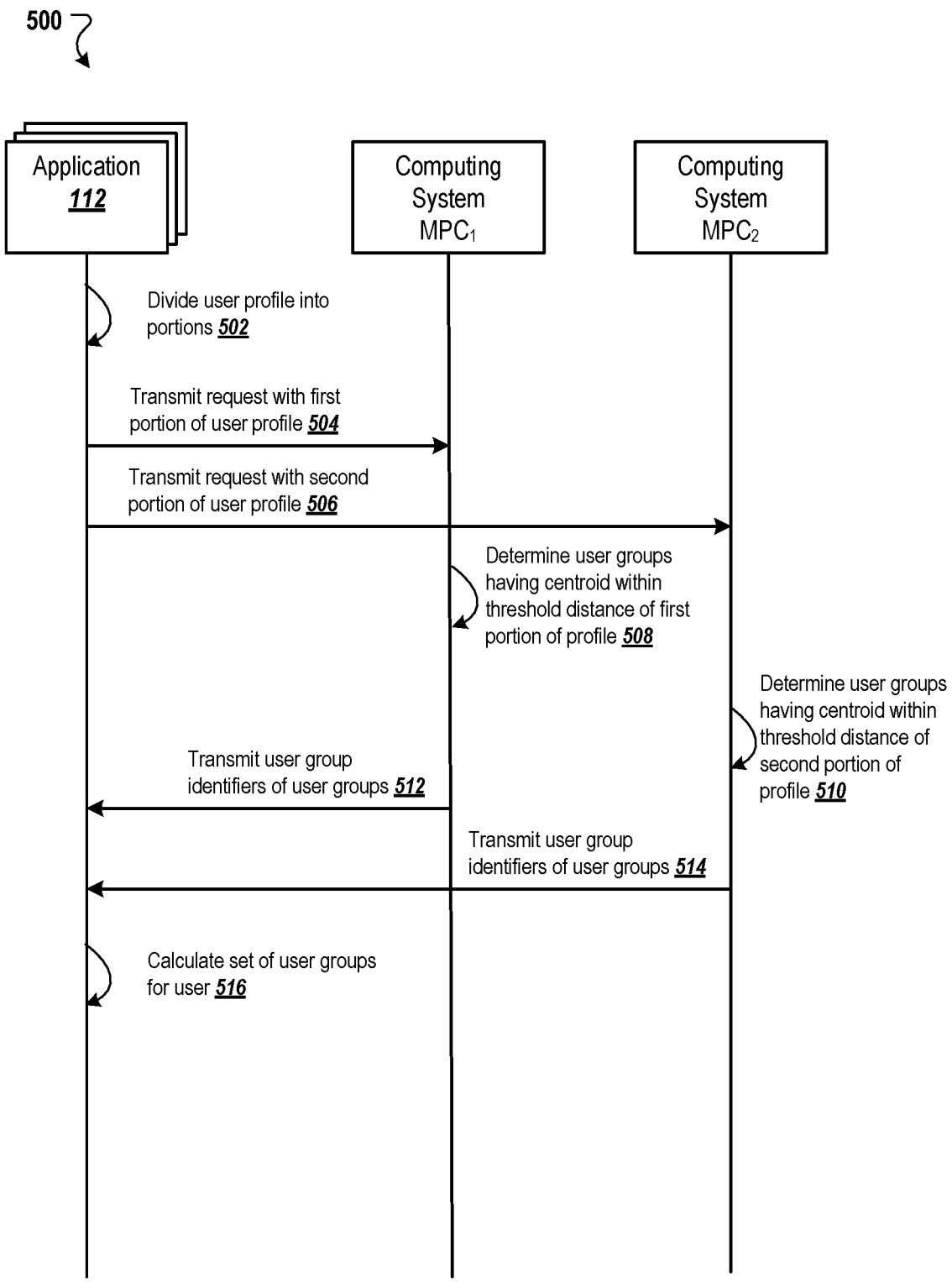
FIG. 5 is a swim lane diagram that illustrates an example process for adding a user to user groups using centroid models.

The MPC cluster 130 determines whether the user should be added to one or more user groups (214). In general, this can include determining whether the user profile of the user is within the threshold distance of the centroid for each of one or more user groups. The computing systems $MPC_1$ and $MPC_2$ can perform a secure MPC process to determine whether the user should be added to one or more user groups such that neither computing system $MPC_1$ nor $MPC_2$ can access any of the users' profiles in plaintext or the user group identifiers that will be suggested for the user in plaintext. Example processes for determining user groups for a user are illustrated in FIGS. 5 and 6 and described below.

The MPC cluster 130 provides zero or more user group identifiers to the application 112 (216). The MPC cluster 130 can provide the user group identifier for each user group to which the user should be added. That is, the MPC cluster 130 can provide the user group identifier for each user group having a centroid of which the user profile of the user is within the threshold distance. To protect user privacy, each computing system $MPC_1$ and $MPC_2$ provides a portion of the user group identifiers or a secret share of the user group identifiers, as described below with reference to FIGS. 5 and 6.

The application 112 updates the user group list for the user (218). For example, the application 112 can add the user to each user group for which the user profile is within a threshold distance of its centroid. That is, the application 112 can add each user group identifier received from the MPC cluster 130 to the user group list maintained at the client device 110 of the user. In some implementations, the application 112 can prompt the user for permission to add the user to each user group.

The application 112 transmits a request for content (220). For example, the application 112 can transmit, to the content platform 150, a request for a digital component in response to loading an electronic resource that has a digital component slot. In some implementations, the request can include one or more user group identifiers for user groups that include the user as a member. For example, the application 112 can obtain one or more user group identifiers from the user group list and provide the user group identifier(s) with the request. In some implementations, techniques can be used to prevent the content platform from being able to associate the user group identifier with the user, the application 112, and/or the client device 112 from which the request is received.

The content platform 150 transmits content to the application 112 (222). For example, the content platform 150 can select a digital component based on the user group identifier(s) and provide the digital component to the application 112. In some implementations, the content platform 150, in collaboration with the application 112 or the device operating system, selects a digital component based on the user group identifier(s), without leaking the user group identifier(s) out of the application 112 or the user device 110.

The application 112 displays or otherwise implements the received content (224). For example, the application 112 can display a received digital component in a digital component slot of an electronic resource.

Example Process for Generating User Profiles

FIG. 3 is a flow diagram that illustrates an example process 300 for generating a user profile and sending the user profile to an MPC cluster. Operations of the process 300 can be implemented, for example, by the client device 110 of FIG. 1, e.g., by the application 112 running on the client device 110 or the operating system of the client device 110. Operations of the process 300 can also be implemented as instructions stored on one or more computer readable media which may be non-transitory, and execution of the instructions by one or more data processing apparatus can cause the one or more data processing apparatus to perform the operations of the process 300.

An application 112 executing on a user's client device 110 receives data for an event (302). The event can be, for example, a presentation of an electronic resource at the client device 110, a presentation of a digital component at the client device 110, a user interaction with an electronic resource or digital component at the client device 110, or a conversion for a digital component, or the lack of user interaction with or conversion for an electronic resource or digital component presented. When an event occurs, a content platform 150 or digital component provider 160 can provide data related to the event to the application 112 for use in generating a user profile for the user.

The application 112 can generate a different user profile for each content platform 150 or digital component provider 160. That is, the user profile of a user and for a particular content platform 150 may only include event data received from the particular content platform 150. This preserves user privacy by not sharing with content platforms data related to events of other content platforms. In some implementations, the application 112, per the request of the content platform 150, may generate a different user profile for each centroid model owned by the content platform 150. Based on the design goal, different centroid models may require different training data. For example, a first model may be used to determine whether to add a user to a user group. A second model may be used to predict whether a user will interact with a digital component. In this example, the user profiles for the second model can include additional data, e.g., whether the user interacted with the digital component, that the user profiles for the first model do not have.

The content platform 150 can send the event data in the form of a profile update token $M_{update}$. The profile update token $M_{update}$ has the following items shown and described in Table 1 below.

TABLE 1

| Item No. | Content | Description |
|---|---|---|
| 1 | Content Platform Domain (e.g., eTLD + 1 domain) | Content platform's domain that uniquely identifies the content platform |
| 2 | Model Identifier | Unique identifier for the content platform's centroid model. This item can have multiple values if the same user profile should be applicable for the training of multiple centroid models for the same owner domain. |

TABLE 1-continued

| Item No. | Content | Description |
|---|---|---|
| 3 | Profile Record | n-dimensional feature vector determined by the content platform based on the event |
| 4 | Token Creation Timestamp | Timestamp indicating when this token is created |
| 5 | Expiration Time | A date and time at which the feature vector will expire and not be used for the user profile calculation. |
| 6 | Profile Decay Rate | Optional rate that defines the rate at which the weight of this event's data decays in the user profile |
| 7 | Operation | Accumulate user profile |
| 8 | Digital Signature | The content platform's digital signature over items 1-7 |

The model identifier identifies the centroid model for which the user profile will be used to train or used to make a user group inference. The profile record is an n-dimensional feature vector that includes data specific to the event, e.g., the type of event, the electronic resource or digital component, time at which the event occurred, and/or other appropriate event data that the content platform 150 (or digital component provider 160) wants to use in training the centroid model and making user group inferences. The operation instructs application 112 to update the user profile based on the profile record. The digital signature is generated based on the seven items using a private key of the content platform 150.

In some implementations, to protect the update token $M_{update}$ during transmission, the content platform 150 encrypts the update token $M_{update}$ prior to sending the update token $M_{update}$ to the application 112. For example, the content platform 150 can encrypt the update token $M_{update}$ using a public key of the application, e.g., PubKeyEnc ($M_{update}$, application_public_key).

In some implementations, the content platform 150 can send the event data to the application 112 without encoding the event data or the update request in the form of a profile update token $M_{update}$. For example, a script originated from the content platform 150 running inside the application 112 may directly transmit the event data and the update request to the application 112 via a script API, where the application 112 relies on World Wide Web Consortium (W3C) origin-based security model and/or (Hypertext Transfer Protocol Secure) HTTPS to protect the event data and update request from falsification or leaking, or man-in-the-middle attack.

The application 112 stores the data for the event (304). If the event data is encrypted, the application 112 can decrypt the event data using its private key that corresponds to the public key used to encrypt the event data. If the event data is sent in the form of an update token $M_{update}$, the application 112 can verify the update token $M_{update}$ before storing the event data. The application 112 can verify the update token $M_{update}$ by (i) verifying the digital signature using a public key of the content platform 150 that corresponds to the private key of the content platform 150 that was used to generate the digital signature and (ii) ensuring that the token creation timestamp is not stale, e.g., the time indicated by the timestamp is within a threshold amount of time of a current time at which verification is taking place. If the update token $M_{update}$ is valid, the application 112 can store the event data, e.g., by storing the n-dimensional profile record. If any verification fails, the application 112 may ignore the update request, e.g., by not storing the event data.

For each centroid model, e.g., for each unique model identifier, the application 112 can store event data for that model. For example, the application 112 can maintain, for each unique model identifier, a data structure that includes a set of n-dimensional feature vectors (e.g., the profile records of the update tokens) and, for each feature vector, the expiration time. An example data structure for a model identifier is shown in Table 2 below.

TABLE 2

| Feature Vector | Expiration |
|---|---|
| n-dimensional feature vector | Expiration time |
| ... | ... |

Upon receiving a valid update token $M_{update}$, the application 112 can update the data structure for the model identifier included in the update token $M_{update}$ by adding the feature vector and expiration time of the update token $M_{update}$ to the data structure. Periodically, the application 112 can purge expired feature vectors from the data structure to reduce storage size. The expiration time in Table 2 is the same expiration time in the update token $M_{update}$ shown in Table 1.

The application 112 determines whether to generate a user profile (306). For example, the application 112 may generate a user profile for a particular centroid model in response to a request from the content platform 150. The request may be to generate the user profile and upload the user profile to the MPC cluster 130. To ensure the security of the request to generate and upload the user profile, the content platform 150 can send, to the application 112, an upload token $M_{upload}$.

The upload token $M_{upload}$ can have a similar structure as the update token $M_{update}$, but with a different operation (e.g., "update server" instead of "accumulate user profile"). The upload token $M_{upload}$ can also include an additional item for an operation delay. The operation delay can instruct the application 112 to delay calculating and uploading the secret shares of the user profile while the application 112 accumulates more event data, e.g., more feature vectors. This enables the centroid model to capture user event data immediately before and after some critical events, e.g., joining a user group. The operation delay can specify the delay time period. In this example, the digital signature can be generated based on the other seven items in Table 1 and the operation delay using the private key of the content platform. The content platform 150 can encrypt the upload token $M_{upload}$ in a similar manner as the update token $M_{update}$, e.g., PubKeyEnc($M_{upload}$, application_public_key), using the application's public key to protect the upload token $M_{upload}$ during transmission.

The application 112 can receive the upload token $M_{upload}$, decrypt the upload token $M_{upload}$ if it is encrypted, and verify the upload token $M_{upload}$. This verification can be similar to the way in which the update token $M_{update}$ is verified. The application 112 can verify the upload token $M_{upload}$ by (i) verifying the digital signature using a public key of the content platform 150 that corresponds to the private key of the content platform 150 that was used to generate the digital signature and (ii) ensuring that the token creation timestamp is not stale, e.g., the time indicated by the timestamp is within a threshold amount of time of a current time at which verification is taking place. If the upload token $M_{upload}$ is valid, the application 112 can generate the user profile. If any verification fails, the application 112 can ignore the upload request, e.g., by not generating a user profile.

In some implementations, the content platform 150 can request the application 112 to upload a user profile without encoding the upload request in the form of a profile upload token $M_{upload}$. For example, a script originated from the content platform 150 running inside the application 112 may directly transmit the upload request to the application 112 via a script API, where the application 112 relies on W3C origin-based security model and/or HTTPS to protect the upload request from falsification or leaking, or man-in-the-middle attack.

If a determination is made to not generate a user profile, the process 300 can return to operation 302 and wait for additional event data from the content platform 150. If a determination is made to generate a user profile, the application 112 generates the user profile (308).

The application 112 can generate the user profile based on the stored event data, e.g., the data stored in the data structure shown in Table 2. The application 112 can access the appropriate data structure based on a model identifier included in the request, e.g., the content platform eTLD+1 domain of item 1 and the model identifier of item 2 of the upload token $M_{upload}$.

The application 112 can compute the user profile by aggregating the n-dimensional feature vectors in the data structure in the study period that have not yet expired. For example, the user profile may be the average of the n-dimensional feature vectors in the data structure in the study period that have not yet expired. The result is an n-dimensional feature vector representing the user in the profile space. Optionally, the application 112 may normalize the n-dimensional feature vector to unit length, e.g., using L2 normalization. The content platform 150 may specify the optional study period.

In some implementations, decay rates can be used to calculate the user profiles. As there may be many content platforms 150 that use the MPC cluster 130 to train centroid models and each content platform 150 may have multiple centroid models, storing user feature vector data may result in significant data storage requirements. Using decay techniques can substantially reduce that amount of data that is stored at each client device 110 for the purposes of generating user profiles for training the machine learning models.

Assume that, for a given centroid model, there are k feature vectors $\{F_1, F_2, \ldots F_k\}$, each of which is a n-dimensional vector and their corresponding age (record_age_in_seconds). The application 112 can compute the user profile using Relationship 1 below:

$$\text{Relationship 1:} \sum_{i=1}^{k} \left( e^{-\frac{record\_age\_in\_seconds_i}{decay\_rate\_in\_seconds}} \times F_i \right)$$

In this relationship, the parameter record_age_in_seconds$_i$ is the amount of time in seconds that the profile record has been stored at the client device 110 and the parameter decay_rate_in_seconds is the decay rate of the profile record in seconds (e.g., received in item 6 of the update token $M_{update}$). In this way, more recent feature vectors carry more weight. This also enables the application 112 to avoid storing feature vectors and only store profile records with constant storage. The application 112 only has to store an n-dimensional vector P and a timestamp user_profile_time for each model identifier, rather than multiple individual feature vectors for each model identifier.

To initialize the n-dimensional vector user profile P and timestamp, the application can set the vector P to a vector of n dimensions where the value of each dimension is zero and set the user_profile_time to epoch. To update the user profile P with a new feature vector $F_x$ at any time, the application 112 can use Relationship 2 below:

$$\text{Relationship 2:} P = e^{-\frac{current\_time - user\_profile\_time}{decay\_rate\_in\_seconds}} \times P + F_x$$

The application 112 can also update the user profile time to the current time (current_time) when updating the user profile with Relationship 2. Note that operation 304 is omitted if the application 112 calculates user profiles with the above decay rate algorithm.

The application 112 generates secret shares of the user profile (310). The application 112 can use a pseudorandom function to split the user profile $P_{current}$ (e.g., the n-dimensional vector $P_{current}$) into secret shares. That is, the application 112 can use pseudorandom function $PRF(P_i)$ to generate two secret shares $\{[P_{current, 1}], [P_{current, 2}]\}$ of the user profile $P_{current}$. The exact splitting can depend on the secret sharing algorithm and crypto library used by the application 112. In some implementations, the application uses Shamir's secret sharing scheme.

In some implementations, the application uses additive secret sharing scheme, i.e., the application 112 generates a random (or pseudorandom) n-dimensional vector nonce. In this example, the application can generate a first secret share that is $P_{current}$+nonce and a second secret share that is $P_{current}$−nonce. The application 112 can then delete the n-dimensional vector nonce.

To deter malicious applications 112 from abusing an upload API for uploading the secret shares of the user profiles, the MPC cluster 130 can require that a trust token issuer sign the secret shares. For each of m user groups, denoted by user group identifier $L_i$, and each of the computing systems $MPC_1$ and $MPC_2$ in the MPC cluster 130, the application 112 can initiate a trust token redemption process with a trust token issuer to obtain a Signed Redemption Record (SRR). The m user groups can be the user groups that (i) are managed by the content platform 150 (or digital component provider 160) that sent the upload token $M_{upload}$ and (ii) that include the user as a member, e.g., the user groups identified in the user group list maintained by the application 112.

In the trust token redemption process, the application 112 can redeem a trust token previously issued to the application 112 based on the application 112 and/or the client device 110 being deemed trusted. This can include sending the trust token and information (e.g., a binding and eTLD+1 of the computing system $MPC_1$ or $MPC_2$ to the trust token issuer with a request to redeem the trust token. The trust token issuer can respond by providing an SRR to the application 112. The application 112 can redeem a trust token for each SRR. An example format of an SRR is shown in Table 3 below.

TABLE 3

| Item No. | Content | Description |
| --- | --- | --- |
| 1.1 | Binding | Binds the model identifier, secret share of user profile, user group $L_i$, and application_public_key to the SRR. |
| 1.2 | Publisher Origin | Could be the eTLD + 1 domain of either computing system $MPC_1$ or $MPC_2$. |
| 1.3 | Signing Timestamp | High resolution timestamp (e.g., in milliseconds) to help the MPC cluster 130 detect stale requests or potential replay attacks. |
| 1.4 | Trust Token Issuer ID | The eTLD + 1 domain of the trust token issuer. |
| 1.5 | Digital Signature | The trust token issuer's signature over the rest of the message, verifiable by the trust token issuer's public key. |

The application 112 can calculate, as the binding, a message authentication code (e.g., hash-based message authentication code (HMAC)) of the model identifier, the secret share of user profile for which the SRR was generated, the user group $L_i$, and the public key of the application 112 (application_public_key). For example, the binding can be represented as HMAC(model_id, share, $L_i$, application_public_key). For a given user profile and given centroid model, the application 112 can calculate this code twice, once for each secret share of the user profile $P_{current}$ and thus one for each computing system $MPC_1$ and $MPC_2$. For example, the parameter "share" for the SRR for computing system $MPC_1$ can be $[P_{current, 1}]$ and the parameter "share" for the SRR for computing system $MPC_2$ can be $[P_{current, 2}]$.

The trust token issuer can generate the timestamp and the digital signature. The trust token issuer can generate the digital signature using a private key of the trust token issuer. This enables recipients of the SRR to verify the signature using a public key corresponding to the private key.

For each of m user groups, denoted by user group identifier $L_i$, and each of the computing systems $MPC_1$ and $MPC_2$ in the MPC cluster 130, the application 112 can then create a user profile update token $M_{profileupdate}$ for transmission to the MPC cluster 130. An example format for the user profile update token $M_{profileupdate}$ is shown in Table 4 below.

TABLE 4

| Item No. | Content | Description |
| --- | --- | --- |
| 1 | Model ID (model_id) | The model identifier for the centroid model. This can be calculated as HMAC(owner_domain, owner_domain_id). The owner domain can be the eTLD + 1 of the owner of the centroid model and the owner domain ID can be the identifier of the model given to the model by the owner. |
| 2 | Secret Share of the User Profile | E.g., first secret share or second secret share if the MPC cluster 130 includes two computing systems. |

TABLE 4-continued

| Item No. | Content | Description |
|---|---|---|
| 3 | User Group Identifier ($L_i$) | E.g., calculated as HMAC(owner_domain, owner_domain_list_id). The owner domain list identifier can be the user group identifier given to the user group by the owner. |
| 4 | Application Public Key (application_public_key) | Public key of the application, e.g., created by the application, dedicated to the current user profile update request. |
| 5 | Token Creation Timestamp | High resolution timestamp (e.g., in milliseconds) to help the recipient detect stale requests or potential replay attacks. |
| 6 | SRR | The Signed Redemption Request for the user profile update request. |
| 7 | Digital Signature | The application's signature over the rest of the message, verifiable by the application's issuer's public key in item 4. |

The application 112 can generate the timestamp and the digital signature. The application 112 can generate the digital signature using a private key of the application 112 that corresponds to the public key in item 4. This enables recipients of the user profile update token $M_{profileupdate}$ to verify the signature using a public key corresponding to the private key.

A compromised application 112 may initiate the user profile update operation on its own, instead of acting per the request of the content platform 150 using the user profile update token $M_{profileupdate}$. To enable the MPC cluster 130 to detect such a situation, the application 112 can optionally include the update token $M_{update}$ received from the content platform 150 in the user profile update token $M_{profileupdate}$.

The application 112 transmits a request to update the user profiles for the model(s) at the MPC cluster 130 using the user profile of the user (312). Each request can include a secret share of the user profile. For example, the application 112 can transmit the user profile update token $M_{profileupdate}$ having the first secret share [$P_{current,\ 1}$] of the user profile $P_{current}$ to computing system $MPC_1$ and transmit the user profile update token $M_{profileupdate}$ having the secondsecret share [$P_{current,\ 2}$] of the user profile $P_{current}$ to computing system $MPC_2$. The application 112 can perform this operation for each model identifier for which user profile update tokens were created.

In this process, for each of the two computing systems $MPC_1$ and $MPC_2$ in the MPC cluster 130, the application 112 sends m requests to update the user profiles, one for each of the m user groups. It may be possible for a compromised computing system in the MPC cluster 130 to correlate those m requests. Such an attack may allow the compromised computing system to learn that an application 112 (and its user) may belong to multiple user groups and the identifiers of those groups.

To mitigate this risk, the MPC cluster 130 can be leveraged. To upload secret shares to computing system $MPC_1$, the application 112 can send a single request to computing system $MPC_2$ with all user profile update tokens with first secret shares [$P_{current,\ 1}$] of the user profile meant for computing system $MPC_1$ individually encrypted with the public key of computing system $MPC_1$. This single request can include a set of encrypted results in the form of: PubKeyEnc($M_{profileupdate\_1}$, $MPC_1$), PubKeyEnc($M_{profileupdate\_2}$, $MPC_1$), . . . PubKeyEnc($M_{profileupdate\_m}$, $MPC_1$), where PubKeyEnc represents a probabilistic asymmetric encryption algorithm and $MPC_1$ represents an asymmetric public key of computing system $MPC_1$.

The probabilistic nature of PubKeyEnc provides semantic security. A semantic secure scheme is one in which only negligible information can be extracted from the encrypted result. Without colluding with computing system $MPC_1$, computing system $MPC_2$ cannot infer any information from the list of encrypted tokens. The computing system $MPC_2$ can break up the list of tokens and send m requests to computing system $MPC_1$, one request per user profile update token $M_{profileupdate}$. The computing system $MPC_2$ can use random or pseudorandom delays between successive requests. In another example, computing system $MPC_2$ can batch upload multiple requests from multiple applications 112 running on multiple client devices 110 to computing system $MPC_1$ to prevent correlating requests from the same application 112.

The application 112 can use a similar technique to upload the second secret shares for computing system $MPC_2$. That is, the application 112 can send a single request to computing system $MPC_1$ with all user profile update tokens with second secret shares [$P_{current,\ 2}$] of the user profile meant for computing system $MPC_2$ individually encrypted with the public key of computing system $MPC_2$. This single request can include a set of encrypted results in the form of: PubKeyEnc($M_{profileupdate\_1}$, $MPC_2$), PubKeyEnc($M_{profileupdate\_2}$, $MPC_2$), . . . PubKeyEnc($M_{profileupdate\_m}$, $MPC_2$), where $MPC_2$ represents an asymmetric public key of computing system $MPC_2$. The computing system $MPC_1$ can break up the list of tokens and send m requests to computing system $MPC_2$, one request per user profile update token $M_{profileupdate}$, e.g., using delay or batch uploads as described above. Given the large number of requests that may be received by the computing systems $MPC_1$ and $MPC_2$, it would be difficult if not impossible for either computing system $MPC_1$ or $MPC_2$ to correlate tokens with individual client devices 110 using these techniques.

The computing systems $MPC_1$ and $MPC_2$ can verify each received request to update a user profile. Upon receiving a request having an encrypted result PubKeyEnc ($M_{profileupdate\_i}$, $MPC_j$), where j is 1 or 2 depending on the computing system, the computing system $MPC_j$ decrypts the encrypted result to recover the user profile update token $M_{profileupdate\_i}$ in plaintext. The computing system $MPC_j$ validates the user profile update token $M_{profileupdate\_i}$. To do so, the computing system $MPC_j$ verifies the digital signature in item 1.5 of the SRR (see Table 3) using the public key fetched from the trust token issuer domain in item 1.4 of the SRR. The computing system $MPC_j$ can also verify the digital signature in item 7 of the user profile update token $M_{profileupdate\_i}$ (see Table 4) using the public key of the application 112 that sent the $M_{profileupdate\_i}$ to the MPC cluster 130.

The computing system $MPC_j$ can also verify the signing timestamp of item 1.3 of the SRR for staleness, e.g., by ensuring that the timestamp is within a threshold duration of a current time at which the verification is being performed. The computing system $MPC_j$ can also verify that the publisher origin in item 1.2 of the SRR matches the identity of the current computing system $MPC_j$. The computing system $MPC_j$ can also verify that the value of the binding in item 1.1 of the SRR matches HMAC(model_id, share, $L_i$, application_public_key) calculated from items 1-4 in the user profile update token $M_{profileupdate\_i}$. The computing system MPC can also verify that the toke creation timestamp in item 5 of the user profile update token $M_{profileupdate\_i}$ is not stale, e.g., by ensuring that the token creation timestamp is within a threshold duration of a current time at which the verification is being performed. The computing system $MPC_j$ can also use the token creation timestamp to detect a potential replay attack, e.g., based on multiple user profile update tokens having the same token creation timestamp. If any of these verifications fail, the computing system $MPC_j$ can ignore the request.

Each computing system $MPC_1$ and $MPC_2$ can maintain a table (or other appropriate data structure) that includes data for each centroid model. For example, the table can be in the form of Table 5 below.

TABLE 5

| Model ID | User Group ID | Sum of All Shares | Number of Applications |
|---|---|---|---|
| model_id | $L_i$ | sum_of_shares | number_of_applications |
| ... | ... | ... | ... |

The row for a centroid model includes the model identifier (model_id), the user group identifier ($L_i$) for the user group included in the model, the sum of all shares of user profiles received for the centroid model, and the number of unique applications 112 (e.g., number of unique client devices) that submitted a secret share of a user profile for the centroid model and for which its secret shares are included in the sum of all shares for the centroid model. The sum of all shares is an n-dimensional vector corresponding to the n-dimensional vector of the user profiles.

When a model/user group pair {model_id, $L_i$} is received that the computing system $MPC_j$ has never received before, the computing system $MPC_j$ can initialize the sum of all shares for the centroid model to a zero vector and initialize the number of applications to zero. To process a valid request to update the user profiles for a centroid model that includes a particular model/user group pair, the computing system $MPC_j$ can find the row for the centroid model/user group pair in the table and update the sum of all shares and the number of applications for the centroid model/user group pair. For example, the computing system $MPC_j$ can add the received secret share of the user profile to the sum of all shares for the centroid model/user group pair and increment the number of applications by one.

Example Processes for Generating and Using Centroid Models

FIG. 4 is a flow diagram that illustrates an example process 400 for generating centroid models. Operations of the process 400 can be implemented, for example, by the MPC cluster 130 of FIG. 1. Operations of the process 400 can also be implemented as instructions stored on one or more computer readable media which may be non-transitory, and execution of the instructions by one or more data processing apparatus can cause the one or more data processing apparatus to perform the operations of the process 400. Although the process 400 is described in terms of generating multiple centroid models, the process 400 can also be used to generate a single centroid model for a single user group.

Each computing system $MPC_1$ and $MPC_2$ obtains a table of user profile data (402). For example, the table can be in the form of Table 5 above. The computing system $MPC_1$ can obtain a table that includes, for each model identifier and user group pair, the sum of first secret shares $[P_{current, 1}]$ received from applications 112 for the user group included in the centroid model identifier by the model identifier and user group ID. Similarly, the computing system $MPC_2$ can obtain a table that includes, for each model identifier and user group pair, the sum of second secret shares $[P_{current, 2}]$ received from applications 112 for the user group included in the centroid model identifier by the model identifier and user group ID.

Each computing system $MPC_1$ and $MPC_2$ enforces a user group size threshold on each model identifier (404). For example, each computing system $MPC_1$ and $MPC_2$ can enforce the size threshold on each row of its table. To enforce the user group size threshold, each computing system $MPC_1$ and $MPC_2$ can determine whether the number of applications for a model identifier exceeds a predefined size threshold.

The computing systems $MPC_1$ and $MPC_2$ notify each other the rows of the table (e.g., the information for each model identifier/user group ID pair) that satisfies the size threshold (406). For example, computing system $MPC_1$ can send, to computing system $MPC_2$, the model identifier, the user group identifier, and the number of applications of each row for which the number of applications exceeds the size threshold. In addition, computing system $MPC_1$ can send, to computing system $MPC_2$, the second half of the sum of shares vector (sum_of_shares$_1$) for each of these rows to computing system $MPC_2$. The transmission of only the second half of sum_of_shares$_1$ based on the horizontal partitioning strategy discussed below.

Similarly, computing system $MPC_2$ can send, to computing system $MPC_1$, the model identifier, the user group identifier, and the number of applications of each row for which the number of applications exceeds the size threshold. In addition, computing system $MPC_2$ can send, to computing system $MPC_1$, the first half of the sum of shares vector (sum_of_shares$_2$) for each of these rows to computing system $MPC_1$.

The computing system $MPC_1$ matches the rows of its table for which the number of applications exceeds the size threshold with the rows received from computing system $MPC_2$. For example, the computing system $MPC_1$ can use the model identifier and/or the user group identifiers of the rows to match corresponding rows that are for the same model and user group. Similarly, the computing system $MPC_2$ matches the rows of its table for which the number of applications exceeds the size threshold with the rows received from computing system $MPC_1$. For example, the computing system $MPC_2$ can use the model identifier and/or the user group identifiers of the rows to match corresponding rows that are for the same model and user group. An example result of this size threshold enforcement and cross-notification in tabular form at computing system $MPC_1$ is shown in Table 6 below.

TABLE 6

| Model ID | User Group ID | Sum of All Shares from $MPC_1$ | Number of Applications from $MPC_1$ | Sum of All Shares from $MPC_2$ | Number of Applications from $MPC_2$ |
|---|---|---|---|---|---|
| model_id | $L_i$ | sum_of_shares$_1$ | num_of_applications$_1$ | $1^{st}$ half of sum_of_shares$_2$ | num_of_applications$_2$ |
| ... | ... | ... | ... | ... | ... |

Similarly, an example result of the size threshold enforcement and cross-notification in tabular form at computing system $MPC_2$ is shown in Table 7 below.

TABLE 7

| Mode IID | User Group ID | Sum of All Shares from $MPC_2$ | Number of Applications from $MPC_2$ | Sum of All Shares from $MPC_1$ | Number of Applications from $MPC_1$ |
|---|---|---|---|---|---|
| model_id | $L_i$ | sum_of_shares$_2$ | num_of_applications$_2$ | $2^{nd}$ half of sum_of_shares$_1$ | num_of_applications$_1$ |
| ... | ... | ... | ... | ... | ... |

For each row, in an ideal situation, the values in "Number of Applications from $MPC_1$" and "Number of Applications from $MPC_2$" should be the same if both are present for a given mode identifier. Due to delays in processing, the two values might have slight differences. If both values are present and the two values vary significantly, or if one of the values does not exceed the size threshold, the computing system that provided the value that does not exceed the size threshold may be compromised. For those rows that the values in "Number of Applications from $MPC_1$" and "Number of Applications from $MPC_2$" meet a closeness threshold (e.g., that are within a threshold difference of each other) and both exceed the size threshold, the computing system can calculate its centroid.

The computing systems $MPC_1$ and $MPC_2$ calculate centroids for the centroid models (408). The computing system $MPC_1$ can calculate the first half of the centroid vector of the user groups in the rows that meet the closeness (e.g., within the threshold difference) and size thresholds. The computing system $MPC_1$ can calculate the centroid for a model identifier and user group (e.g., for a row) using Relationship 3 below.

Relationship 3: Centroid $(model_{id}, L_i)$ =

$$\frac{2 \times (\text{first half of sum\_of\_shares}_1 + \text{first half of sum\_of\_shares}_2)}{\text{num\_of\_applications}_1 + \text{num\_of\_applications}_2}$$

Similarly, computing system $MPC_2$ can calculate the centroid for a model identifier and user group (e.g., for a row) using Relationship 4 below.

Relationship 4: Centroid $(model_{id}, L_i)$ =

$$\frac{2 \times (\text{second half of sum\_of\_shares}_1 + \text{second half of sum\_of\_shares}_2)}{\text{num\_of\_applications}_1 + \text{num\_of\_applications}_2}$$

The centroid of a user group is generally not privacy sensitive and cannot easily be manipulated to allow malicious applications 112, content platforms 150, or computing systems $MPC_1$ and $MPC_2$ of the MPC cluster 130 to steal user profiles.

At the end of this process, computing system $MPC_1$ has the first half of centroids for all lists exceeding the list size threshold. An example of the result of this process is shown in tabular form in Table 8 below. The computing system $MPC_2$ has the same data for the second half of the centroid vector for each model identifier and user group identifier. The trained centroid model for the user groups can include a first centroid model that includes the first half of the centroid for each of these user groups and a second centroid model that includes the second half of the centroid for each user group.

TABLE 8

| Model ID | User Group ID | Centroid | List Size |
|---|---|---|---|
| model_id | $L_i$ | First half of centroid vector | $\frac{\text{num\_of\_applications}_1 + \text{num\_of\_applications}_2}{2}$ |
| ... | ... | ... | ... |

FIG. 5 is a swim lane diagram that illustrates an example process 500 for adding a user to user groups using centroid models. Operations of the process 500 can be implemented, for example, by the MPC cluster 130 and the client device 110 of FIG. 1, e.g., the application 112 running on the client device 110. Operations of the process 500 can also be implemented as instructions stored on one or more computer readable media which may be non-transitory, and execution of the instructions by one or more data processing apparatus can cause the one or more data processing apparatus to perform the operations of the process 500.

An application 112 running on the client device 110 can query the MPC cluster 130 for suggested user groups for a user in response to a request from a content platform 150 or digital component provider 160. For example, the request can be to determine whether the user should be added to a user group owned by the requester using the centroid models generated for and owned by the requester. For example, a content platform 150 can manage many user groups and the MPC cluster 130 can train and use one or more centroid models for the user groups to determine whether users should be added to those user groups.

To request the application to query a centroid model, the requester can transmit, to the client device 110 a download groups token $M_{download}$. The token $M_{download}$ can have the following items shown and described in Table 9 below.

TABLE 9

| Item No. | Content | Description |
|---|---|---|
| 1 | Content Platform's eTLD + 1 domain | Uniquely identifies the content platform, i.e., the owner of the model (would be similar for digital component provider if owned by digital component provider) |
| 2 | Content Platform Model ID | Unique model identifier assigned by content platform (same for digital component provider if owner) |
| 3 | Threshold Distance (d) | The maximum allowed distance between the user profile and the centroid of fetched user groups |
| 4 | Token Creation Timestamp | High-resolution timestamp (e.g., in milliseconds) indicating when this token is created |
| 5 | Operation | Fetch user groups |
| 6 | Digital Signature | The content platform's digital signature over the rest of the token (e.g., over items 1-5) using content platform's private key |

In some implementations, the content platform 150 can encrypt the download groups token $M_{download}$ using the public key of the application 112. The content platform 150 can then invoke an API of the application to fetch user group identifiers via its own or an SSP's script. The application 112 can decrypt and validate the download groups token $M_{download}$ in the same way it decrypts and validates the user profile update token $M_{profileupdate}$.

For a given tuple of model_id, user profile P, and threshold distance d, the application 112 should fetch all user group identifiers $L_i$, where |P−Centroid(model_id, $L_i$)|<d. In this example, the function "Centroid(model_id, $L_i$) returns the value in the Centroid column from the row marked by model_id and $L_i$ in Table 8.

To prevent either computing system $MPC_1$ or $MPC_2$ from learning the user profile P in its entirety, the application 112 divides the user profile P for the user into portions (502). The application 112 can divide the user profile into a respective portion for each computing system of the MPC cluster 130. In this example, the application 112 can split the user profile into two portions, a first portion for computing system $MPC_1$ and a second portion for computing system $MPC_2$. Assuming the user profile P is an n-dimensional vector and the user profile $P=\{p_1, p_2, \ldots, p_n\}$, the two halves $P_1$ and $P_2$ would be $P_1=\{p_1, p_2, \ldots, p_{n/2}\}$ and $P_2=\{p_{n/2+1}, \ldots, p_n\}$. The computing systems $MPC_1$ and $MPC_2$ can calculate their centroids of user groups accordingly, i.e., Centroid(model_id, $L_i$) becomes $Centroid_1$(model_id, $L_i$) and $Centroid_2$(model_id, $L_i$).

In some implementations, the application 112 can also add differential privacy noise to better protect user privacy. For example, the application 112 can add one-time user noise ΔP to the user profile P, e.g., prior to splitting the user profile P into portions.

Let P'=P+ΔP. The application 112 applies a horizontal partition to divide P' into two halves, $P_1$' and $P_2$'. Let d'=d+|ΔP|. The application 112 sends the first half $P_1$' to computing system $MPC_1$ (504). For example, the application 112 can send a request with two parameters {$P_1$', d'} to the computing system $MPC_1$. The request can be to fetch all user group identifiers $L_i$ where |$P_1$'−$Centroid_1$(model_id, $L_i$)|<d'.

Similarly, the application 112 sends the second half $P_2$' to computing system $MPC_2$ (506). For example, the application 112 can send a request with two parameters {$P_2$', d'} to computing system $MPC_2$. The request can be to fetch all user group identifiers $L_i$ where |$P_2$'−$Centroid_1$(model_id, $L_i$)|<d'.

The computing system $MPC_1$ can determine user groups having a centroid within a threshold distance d' of the first half $P_1$' of the user profile P' (508). The computing system $MPC_1$ can determine, for each user group, the distance between the first half $P_1$' and the centroid for the user group, i.e., |$P_1$'−$Centroid_1$(model_id, $L_i$)|. The application 112 can then determine which user groups have a distance that is less than the distance d'. The user group identifiers for these user groups can be represented by $U_1$.

Similarly, the computing system $MPC_2$ can determine user groups having a centroid within a threshold distance d' of the second half $P_2$' of the user profile P' (510). The computing system $MPC_2$ can determine, for each user group, the distance between the second half $P_2$' and the centroid for the user group, i.e., |$P_2$'−$Centroid_2$(model_id, $L_i$)|. The application 112 can then determine which user groups have a distance that is less than the distance d'. The user group identifiers for these user groups can be represented by $U_2$.

The computing system $MPC_1$ transmits the set of user group identifiers $U_1$ to the application 110 (512). Similarly, the computing system $MPC_2$ transmits the set of user group identifiers $U_2$ to the application 110 (514).

The application 112 calculates the set of user groups for the user (516). The application 112 can calculate the set U of all user group identifiers Li that satisfy |P−Centroid (model_id, $L_i$)|<d using the sets $U_1$ and $U_2$. As U⊆($U_1$∪$U_2$), the application 112 can calculate the set U from $U_1$ and $U_2$ because U={$L_i$} where |P−Centroid(model_id, $L_i$)|<d and $L_i$∈$U_1$∪$U_2$.

The previous approach assumes that the centroid of user groups are not privacy sensitive and it is acceptable to leak the superset of user groups, i.e., $U_1$ and $U_2$, that the browser should join to either $MPC_1$ and $MPC_2$. In situations demanding stronger privacy protection, the following approach can be used. FIG. 6 is a swim lane diagram that illustrates an example process 600 for generating a centroid model and using the centroid model to add a user to a user group corresponding to the centroid model with much stronger privacy protection. Operations of the process 600 can be implemented, for example, by the MPC cluster 130 and the client device 110 of FIG. 1, e.g., the application 112 running on the client device 110. Operations of the process 600 can also be implemented as instructions stored on one or more computer readable media which may be non-transitory, and execution of the instructions by one or more data processing apparatus can cause the one or more data processing apparatus to perform the operations of the process 600.

The MPC cluster 130 can train a centroid model for one or more user groups. In this example, the centroid models are queried using secret shares of user profiles. Thus, each computing system $MPC_1$ and $MPC_2$ can determine a respective secret share of the centroid of the user group using secret shares of user profiles of a training set, e.g., secret shares of user profiles uploaded by client devices 110.

For each user group, computing system $MPC_1$ calculates a first secret share of the centroid of the user group (602). The centroid for a centroid model identified by model identifier model_id and for a user group identified by user group identifier $L_i$ can be represented as sum_of_profile (model_id, $L_j$). The first secret share [sum_of_profile$_{model\_id, i, 1}$]=$\Sigma[P_{j,1}]$ for all user profiles $P_i$ that is a member of the user group $L_i$. That is, the first secret share of the centroid for user group $L_i$ represents a sum of the first secret shares of the user profiles $P_i$ in the user group $L_i$.

For each user group, computing system MPC$_2$ calculates a second secret share of the centroid of the user group (604). The centroid for a centroid model identified by model identifier model_id and for a user group identified by user group identifier $L_i$ can be represented as sum_of_profile (model_id, $L_i$). The second secret share [sum_of_profile$_{model\_id, i, 2}$]=$\Sigma[P_{j,2}]$ for all user profiles $P_i$ that is a member of the user group $L_i$. That is, the second secret share of the centroid for user group $L_i$ represents a sum of the second secret shares of the user profiles $P_i$ in the user group $L_i$.

The centroid model can include the first share of the centroid for each user group and the second share of the centroid of each user group. The first share of each centroid can be maintained confidentially at computing system MPC$_1$ and the second share of each centroid can be maintained confidentially at computing system MPC$_2$.

An application 112 running on the client device 110 divides the user profile of the user into secret shares (606). For example, the application 112 can calculate a first secret share [P$_1$] of the user profile P for computing system MPC$_1$ and a second secret share [P$_2$] of the user profile P for computing system MPC$_2$. The exact splitting can depend on the secret sharing algorithm and crypto library used by the application 112. In some implementations, the application uses Shamir's secret sharing scheme.

The application 112 sends a request to fetch user group identifiers for the user to computing system MPC$_1$ (608). The request can include the first secret share [P$_1$] of the user profile P. In some implementations, the request includes a query token M$_{query1}$. An example format of the query token is shown in Table 9 below.

The application 112 sends a request to fetch user group identifiers for the user to computing system MPC$_2$ (610). The request can include the second secret share [P$_2$] of the user profile P. In some implementations, the request includes a query token M$_{query2}$. An example format of the query token is shown in Table 9 below.

TABLE 9

| Item No. | Content | Description |
|---|---|---|
| 1 | Model Identifier (model_id) | Unique identifier for the centroid model being queried |
| 2 | User Profile Secret Share | [P$_1$] if the recipient of the token is MPC$_1$ or [P$_2$] if the recipient is MPC$_2$ |
| 3 | Threshold Distance (d) | The maximum allowed distance between the user profile and the centroid of fetched user groups |
| 4 | Token Creation Timestamp | High-resolution timestamp (e.g., in milliseconds) indicating when this token is created |
| 5 | Destination Domain | Domain of MPC$_1$ if MPC$_1$ is the recipient of the token or domain of MPC$_2$ if MPC$_2$ is the recipient of the token |
| 6 | SRR | Signed Redemption Record from redeeming a trust token for the request |
| 7 | Application Public Key (application_public_key) | The application's public key. The SRR can bind the key by carrying SHA256(application_pulic_key) |

TABLE 9-continued

| Item No. | Content | Description |
|---|---|---|
| 8 | Digital Signature | The content platform's digital signature over the rest of the token (e.g., over items 1-7) |

In some implementations, the application 112 can send two separate requests, as shown in FIG. 6. To save bandwidth and battery consumption of the client device 110, the application 112 can combine the two requests (e.g., the two query tokens M$_{query1}$ and M$_{query2}$) into a single request and send the single request to one of the computing systems MPC$_1$ or MPC$_2$. To do so, the application 112 can encrypt the query token intended to the other computing system MPC$_1$ or MPC$_2$. For example, the application 112 can encrypt the query token M$_{query2}$ using an encryption public key of computing system MPC$_2$, e.g., using a probabilistic asymmetric public key algorithm. For example, the application 112 can generate the encryption result PubKeyEnc(M$_{query2}$, MPC$_2$) using a public key of computing system MPC$_2$. The application 112 can then send the query token M$_{query1}$ and the encryption result PubKeyEnc(M$_{query2}$, MPC$_2$) to computing system MPC$_1$.

The computing system MPC$_1$ can validate the query token M$_{query1}$ in a similar manner as the computing system MPC$_1$ validates the update token M$_{profileupdate}$, as described above with reference to FIG. 3. The computing system MPC$_1$ can also transmit a request with the encryption result PubKeyEnc(M$_{query2}$, MPC$_2$) to computing system MPC$_2$. The computing system MPC$_2$ can decrypt the encryption result using its private key corresponding to the public key used to encrypt the query token M$_{query2}$. The computing system MPC$_2$ can then validate the query token M$_{query2}$ in a similar manner as the computing system MPC$_2$ validates the update token M$_{profileupdate}$, as described above with reference to FIG. 3.

In some implementations, each computing system MPC$_1$ and MPC$_2$ can determine, for each of multiple user groups associated with a centroid model, respective secret shares of user group eligibility eligible_group$_i$ for the user group. The user group eligibility eligible_group$_i$ for a user profile and user group indicates whether the user profile of the user is within the threshold distance of the centroid of the user group based on the centroid model.

In this example, each computing MPC$_1$ and MPC$_2$ can look up all user groups $L_i$ associated with a model identifier model_id, where 1≤i≤N and N is the number of user groups associated with the model identifier model_id. For each user group $L_i$, computing system MPC$_1$ can calculate a first secret share of the square of Euclidean distance [d$_{i,1}$] using Relationship 5 below.

[d$_{i,1}$]=$\Sigma$([P$_1$]×num_apps_group$_i$-[sum_of_profile_model_id$_{i,1}$])$^2$      Relationship 5

In Relationship 5, the parameter num_apps_group$_i$ represents the number of applications (e.g., number of unique users) in the user group and for which user profiles were used to generate the centroid for the user group $L_i$. The computing system MPC$_1$ can then calculate the first secret share [eligible_group$_{i,1}$] of the user group eligibility eligible_group$_i$ for the user profile and user group using Relationship 6 below:

[eligible_group$_{i,1}$]=[d$_{i,1}$]<(num_apps_group$_i$×d)$^2$      Relationship 6

That is, computing system $MPC_1$ can calculate whether the first secret share of the Euclidean distance is less than the threshold distance. The computing system $MPC_2$ can compute the second secret share [eligible_group$_{i,2}$] of the user group eligibility eligible_group$_i$ for the user profile and user group in a similar manner using Relationships 7 and 8 below.

$$[d_{i,2}] = \Sigma([P_2] \times \text{num\_apps\_group}_i - [\text{sum\_of\_profile\_model\_id}_{i,2}])^2 \quad \text{Relationship 7}$$

$$[\text{eligible\_group}_{i,2}] = [d_{i,2}] < (\text{num\_apps\_group}_i \times d)^2 \quad \text{Relationship 8}$$

Each computing system $MPC_1$ and $MPC_2$ can transmit their respective secret shares of the user group eligibility to the application 112. The application 112 can then combine the secret shares to determine whether to add the user to the user group. As the response size is proportional to the number of user groups in the model, the response size can be large for content platforms that have a large number of user groups associated with a centroid model. However, this technique for determining whether to add a user to a user group can be used when the number of user groups is small or bandwidth consumption is not a concern. The remaining operations of this process 600 provides an improvement over this technique that can be used when the number of user groups may be large and greatly reduces the response size.

Conceptually, for a user group eligibility eligible_group$_i$ for a user profile and user group, the application 112 can randomly or pseudorandomly generate two numbers $g_i$ and $h_i$, each of which has a value of either zero or one with equal probability. In this example, the sum of $g_i$ and $h_i$ would be zero with 25% probability, one with 50% probability, or two with 25% probability.

The application 112 can estimate the value of the user group eligibility eligible_group$_i$ to be $(g_i + h_i) = 1$. Via Table 10 below, the MPC cluster 130 can inform the application 112 whether its estimation was correct.

TABLE 10

| | $g_i + h_i$ | | |
|---|---|---|---|
| eligible_group$_i$ | 0 | 1 | 2 |
| 0 | 1 | 0 | 1 |
| 1 | 0 | 1 | 0 |

For example, if $g_i + h_i = 1$ and eligible_group$_i = 1$, the application estimated the value of eligible_group$_i$ correctly such that the corresponding cell's value is 1. On the other hand, if $g_i + h_i = 2$ and eligible_group$_i = 1$, the application 112 estimated the value of eligible_group$_i$ incorrectly such that the corresponding cell's value is 0. In this case, the application 112 can flip its estimation so that the application 112 can estimate the value of eligible_group$_i$ correctly. It can be verified that the above table is equivalent to: $(1 - \text{eligible\_group}_i) \times (1 - (g_i + h_i - 1)^2) + \text{eligible\_group}_i \times (g_i + h_i - 1)^2$ To implement this concept using secure MPC, the application 112 can generate two random (or pseudorandom) seeds (e.g., of 16 bytes or another appropriate data size) seed$_1$ and seed$_2$ (612). The application 112 can send the first seed seed$_1$ to computing system $MPC_1$ (614). The application 112 can send the second seed seed$_2$ to computing system $MPC_2$ (616).

The MPC cluster 130 can use a pseudorandom function (PRF) and the seeds to generate the numbers $g_i$ and $h_i$, which may be random or pseudorandom. The PRF can be a function that generates a value of either 0 or 1 with a 50% probability. For example, the PRF can be one such that PRF(seed, i) → {0,1}. Computing system $MPC_1$ can generate $g_i$ using the PRF and seed$_1$ (e.g., PRF(seed$_{1,i}$)) and computing system $MPC_2$ can generate $h_i$ using the PRF and seed$_2$ (e.g., PRF(seed$_{2,i}$)). The numbers $g_i$ and $h_i$ are two additive secret shares of $g_i + h_i$ (which is the application's estimate of whether the user should be added to user group $L_i$), which can be represented as $[g_i]$ and $[h_i]$ to indicate that they are secret shares.

Instead of calculating $(1 - \text{eligible\_group}_i) \times (1 - (g_i + h_i - 1)^2) + \text{eligible\_group}_i \times (g_i + h_i - 1)^2$ in plaintext, the MPC cluster 130 calculates $(1 - [\text{eligible\_group}_i]) \times (1 - ([g_i + h_i] - 1)^2) + [\text{eligible\_group}_i] \times ([g_i + h_i] - 1)^2$ in secret shares. Note that in this equation, it includes a square of a secret share and the multiplication between two secret shares. The calculation of the square and multiplication using a secure MPC process between computing systems $MPC_1$ and $MPC_2$ can require one round of remote procedure calls (RPCs) between the two computing systems $MPC_1$ and $MPC_2$. All other operations can be performed locally within each computing system $MPC_1$ and $MPC_2$.

In particular, each of the computing systems $MPC_1$ and $MPC_2$ can calculate a secret share of an estimation flag flag$_i$ for each user group $L_i$. The estimation flag flag$_i$ for a user group indicates whether the application 112 estimated correctly whether the user should be added to the user group correctly.

The computing system $MPC_1$ calculates the first secret share [flag$_{i,1}$] of the estimation flag flag$_i$ for each user group $L_i$ (618). The computing system $MPC_1$ can calculate the first secret share [flag$_{i,1}$] of the estimation flag flag$_i$ for each user group $L_i$ using Relationship 9 below.

$$[\text{flag}_{i,1}] = (1 - [\text{eligible\_group}_{i,1}]) \times (1 - ([g_i] - 1)^2) + [\text{eligible\_group}_{i,1}] \times ([g_i] - 1)^2 \quad \text{Relationship 9}$$

The computing system $MPC_2$ calculates the second secret share [flag$_{i,2}$] of the estimation flag flag$_i$ for each user group $L_i$ (620). The computing system $MPC_2$ can calculate the second secret share [flag$_{i,2}$] of the estimation flag flag$_i$ for each user group $L_i$ using Relationship 10 below.

$$[\text{flag}_{i,2}] = (1 - [\text{eligible\_group}_{i,2}]) \times (1 - ([h_i] - 1)^2) + [\text{eligible\_group}_{i,2}] \times ([h_i] - 1)^2 \quad \text{Relationship 10}$$

The computing systems $MPC_1$ and $MPC_2$ reconstruct the estimation flag flag$_i$ for each user group $L_i$ (622). The computing systems $MPC_1$ and $MPC_2$ can reconstruct the estimation flag flag$_i$ for each user group $L_i$ based on the two secret shares [flag$_{i,1}$] using one RPC between the two computing systems $MPC_1$ and $MPC_2$. If the value of the estimation flag flag$_i$ for a user group $L_i$ is one, the application estimated whether the user should be added to the user group $L_i$ accurately. Because neither computing system $MPC_1$ nor $MPC_2$ knows what the application 112 actually estimated, knowing the value of the estimation flag flag$_i$ for a user group $L_i$ does not leak any information to the computing systems $MPC_1$ or $MPC_2$.

The computing system $MPC_1$ transmits the estimation flags flag$_i$ for each user group $L_i$ to the application 112 (624). For example, computing system $MPC_1$ can transmit {flag$_1$, flag$_2$, . . . } for the user groups to the application 112. Plaintext flag$_i$ has a value of either zero or one, i.e., indicating whether estimated correctly or incorrectly. That is, a value of one means that the application 112 estimated whether the user should be added to the i-th group correctly and a value of zero if not. Therefore, each plaintext flag$_i$ can be represented by 1 bit.

For each user group associated with the centroid model, computing system $MPC_1$ can return a single bit (flag$_i$). For a centroid model with one million user groups, the response size would be 128 kilobytes (KB), which is practical based on the required latency of the requests and the frequency at which the requests are submitted to the MPC cluster 130.

The application 112 determines whether to add the user to user groups based on the estimation flags (626). For each user group, the application can calculate $flag_i==(g_i+h_i==1)$. The operation "==" represents an equality operation that returns true if both values are equal. If the result of the calculation is true, the application 112 should join the i-th user group associated with the centroid model.

The application 112 can then request the user group identifiers for the user groups that the application 112 should join from the MPC cluster 130. To do so, the application 112 can initiate a dense private information retrieval (PIR) to the computing systems $MPC_1$ and $MPC_2$ with any suitable dense private information retrieval (PIR) algorithms and implementation. Some implementations rely on Distributed Point Functions (DPFs). In such implementations, the application 112 can generate the DPFs (628). For the i-th user group that the application 112 should join, the application 112 can generate two DPFs, $g_i$ and $h_i$ such that $g_i(j)+h_i(j)=1$ if j=i, and $g_i(j)+h_i(j)=0$ otherwise.

The application 112 can transmit a first request to computing system $MPC_1$ (630). The first request can include the point function $g_i$ for each user group that the application 112 should join.

The application 112 can transmit a second request to computing system $MPC_2$ (632). The second request can include the point function $h_i$ for each user group that the application 112 should join.

For each point function $g_i$, computing system $MPC_1$ calculates and returns a first secret share of a user group identifier result to the application 112 (634). The application 112 can calculate the first secret share of the user group identifier result using Relationship 11 below.

$result_{i,1}=\Sigma_j g_i(j) \times group\_id_j$            Relationship 11

For each point function $h_i$, computing system $MPC_2$ calculates and returns a second secret share of a user group identifier result to the application 112 (636). The application 112 can calculate the second secret share of the user group identifier result using Relationship 12 below.

$result_{i,2}=\Sigma_j h_i(j) \times group\_id_j$            Relationship 12

The application 112 can add the user to one or more user groups (638). The application 112 can reconstruct the user group identifier for each user group that the user should join using the first share $result_{i,1}$ and the second share $result_{i,2}$ for the user group. For example, the application 112 can calculate the sum of the two secret shares to obtain the user group identifier for the user group, if the two secret shares are additive secret shares. The application 112 can then add the user group identifier to the user group list.

In this process 600 of FIG. 6, neither computing system in the MPC cluster 130 knows the centroids of the user groups in plaintext, neither knows the application query parameter, i.e., the user profile, and neither knows the user groups that the user will join, thus preserving user privacy.

In situation with relaxed privacy requirements, e.g., the computing systems $MPC_1$ and $MPC_2$ can know the query result in plaintext, the computing systems $MPC_1$ and $MPC_2$ can reconstruct the user group eligibility $eligible\_group_i$ results from the two secret shares and only return the user group identifiers $L_i$ to the application 112 in the query response if the corresponding $eligible\_group_i$ is true.

In some implementations, the training of the centroid models and the querying of the centroid models can be performed by an aggregation service. The aggregation service can include the MPC cluster 130 and communicate with the content platforms 150, e.g., rather than the client devices 110. In such a case, when querying which user groups the application 112 should join, the application 112 may not send the user profile of a user to the content platform 150 for forwarding to the MPC cluster 130 for privacy reasons. One option would be to configure the content platforms 150 to transmit the centroids of the user groups to the application 112. However, this could consume significant bandwidth.

Another option is for the content platform 150 to infer the user groups for a use based on a secure mobile ID (e.g., FLOC ID) for the user, first party cookie data received from a first party cookie, and the URL of a digital component request. However, this may not be as accurate as the techniques described above.

Figure 7:
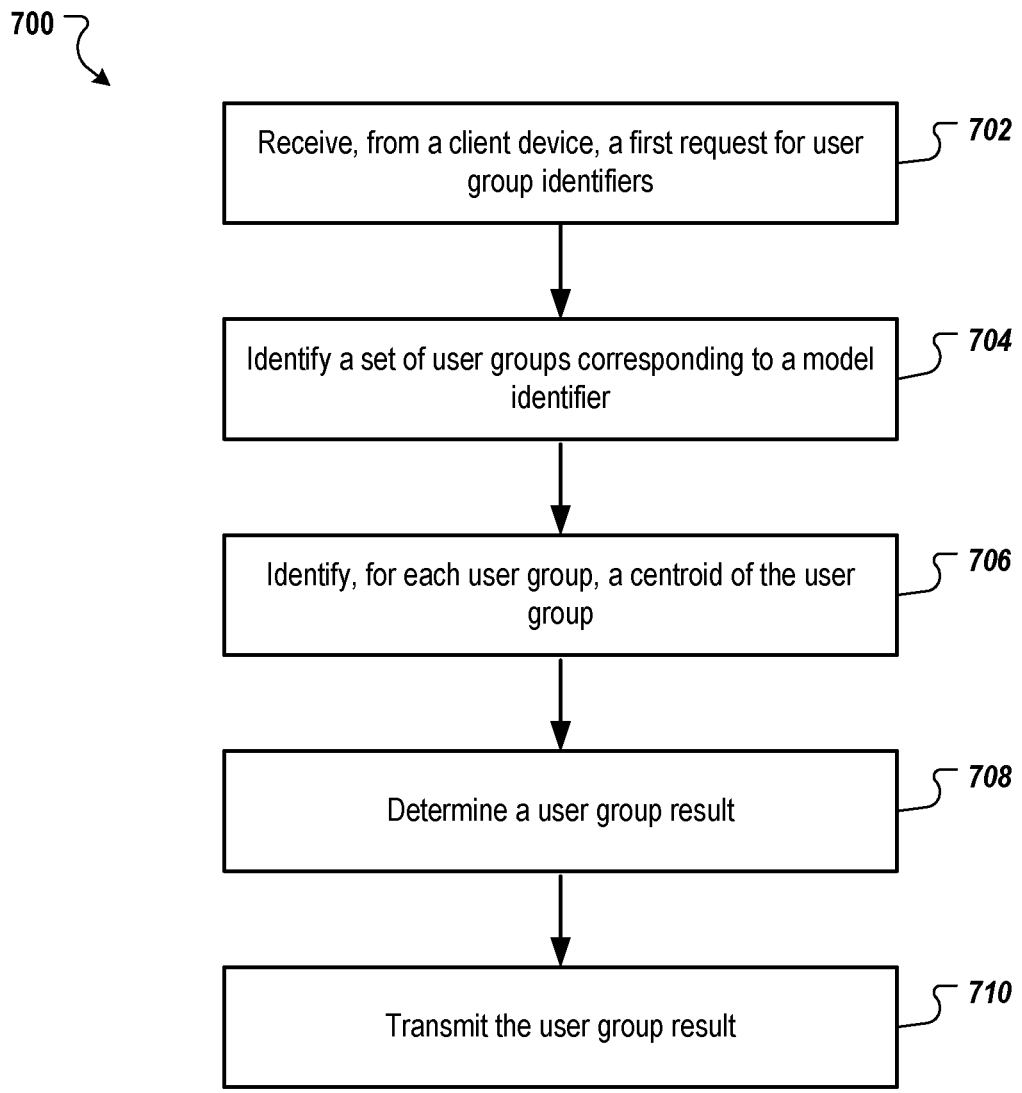
FIG. 7 is a flow diagram that illustrates an example process for determining a user group result based on user profile data of a user and centroid models.

FIG. 7 is a flow diagram that illustrates an example process 700 for determining a user group result (i.e., whether the application 112 should join one or more user groups) based on user profile data of a user and centroid models. Operations of the process 700 can be implemented, for example, by the MPC cluster 130. Operations of the process 700 can also be implemented as instructions stored on one or more computer readable media which may be non-transitory, and execution of the instructions by one or more data processing apparatus can cause the one or more data processing apparatus to perform the operations of the process 700.

A first request for user group identifiers is received (702). A first computing system, e.g., $MPC_1$, of the MPC cluster 130 can receive the first request from an application 112 running on a client device 110. The application 112 can send a respective second request to each other computing system, e.g., $MPC_2$, of the MPC cluster 130. The request can be for user group identifiers of user groups that the user is to be added, e.g., each user group for which the user profile of the user is within a threshold distance of the centroid of the user group.

In general, each request can include user profile data for the user profile of the user. The first request can include first user profile data and each second request sent to each second computing system can include respective second user profile data. The user profile data can vary based on the cryptography techniques used.

For example, if the centroids are determined using an MPC process and horizontal partitioning, as described with reference to FIG. 4, the user profile data of each request can include a respective portion of the user profile of the user. If each computing system of the MPC cluster 130 has a secret share of the centroid, the user profile data of each request can include a respective secret share of the user profile of the user. In either case, the user profile data can also include a model identifier for the centroid model and a threshold distance.

A set of user groups corresponding to the model identifier is identified (704). For example, a content platform 150 or digital component provider 160 can have the MPC cluster 130 generate a centroid model for a set of user groups. Each computing system in the MPC cluster 130 can store data identifying the user group identifiers for the user groups that correspond to a centroid model, e.g., by linking the model identifier with each user group identifier. The first computing system can identify the set of user groups based on the stored data. Each user group identifier and the model identifier can be referred to as a centroid model and user group identifier pair.

For each user group in the set of user groups, a centroid for the user group is identified (706). When the MPC cluster 130 generates the centroid models, the MPC cluster 130 can determine the centroid for each user group corresponding to the centroid model. The form of the centroid can vary based on the cryptography techniques used. For example, if the centroids are determined using an MPC process and horizontal partitioning, as described with reference to FIG. 4, each computing system of the MPC cluster 130 can have a centroid for the user group that is determined based on portions, e.g., halves, of the sum of the secret shares of the user profiles used to generate the centroid. If secret sharing is used, each computing system of the MPC cluster 130 can have a secret share of the centroid for the user group.

A user group result is determined (708). The user group result is indicative of one or more user groups to which to add the user. For example the user group result can be indicative of user groups having a centroid that is within the threshold distance of the user profile of the user.

The user group result is transmitted (710). For example, the first computing system can transmit its user group result to the application 112 running on the client device 110.

The first computing system can determine the user group result in different ways depending on the cryptography techniques used and the user group result can vary based on the cryptography techniques used. For example, if horizontal partitioning is used, the first computing system can determine, for each user group in the set of user groups, whether the first portion of the user profile included in the first user profile data is within the threshold distance of the centroid of the user group previously determined by the first computing system, as described with reference to FIG. 5. In this example, the user group result can include the user group identifiers of the user groups for which the centroid is within the threshold distance of the user profile of the user. Each other computing system can perform a similar process using its centroid and received portion of the user profile. Each computing system can provide a user group result that includes the user group identifiers of the user groups for which the centroid is within the threshold distance of the user profile of the user. The application of the client device can then determine a list of user groups to which to add the user based on the user group result received from each computing system, as described with reference to FIG. 5.

If secret sharing is used, the user group result can include an estimation flag for each user group in the set of user groups, as described with reference to FIG. 6. The estimation flag for a user group indicates whether the application estimated whether the user is to be added to the user group correctly. The application 112 can use the estimation flags to determine whether to add the user to the user groups, e.g., based on whether the application 112 estimated that the user should be added to the user group and whether the estimation was correct. If so, the application 112 can then query the MPC cluster 130 for the user group identifier corresponding to the estimation flag.

Figure 8:
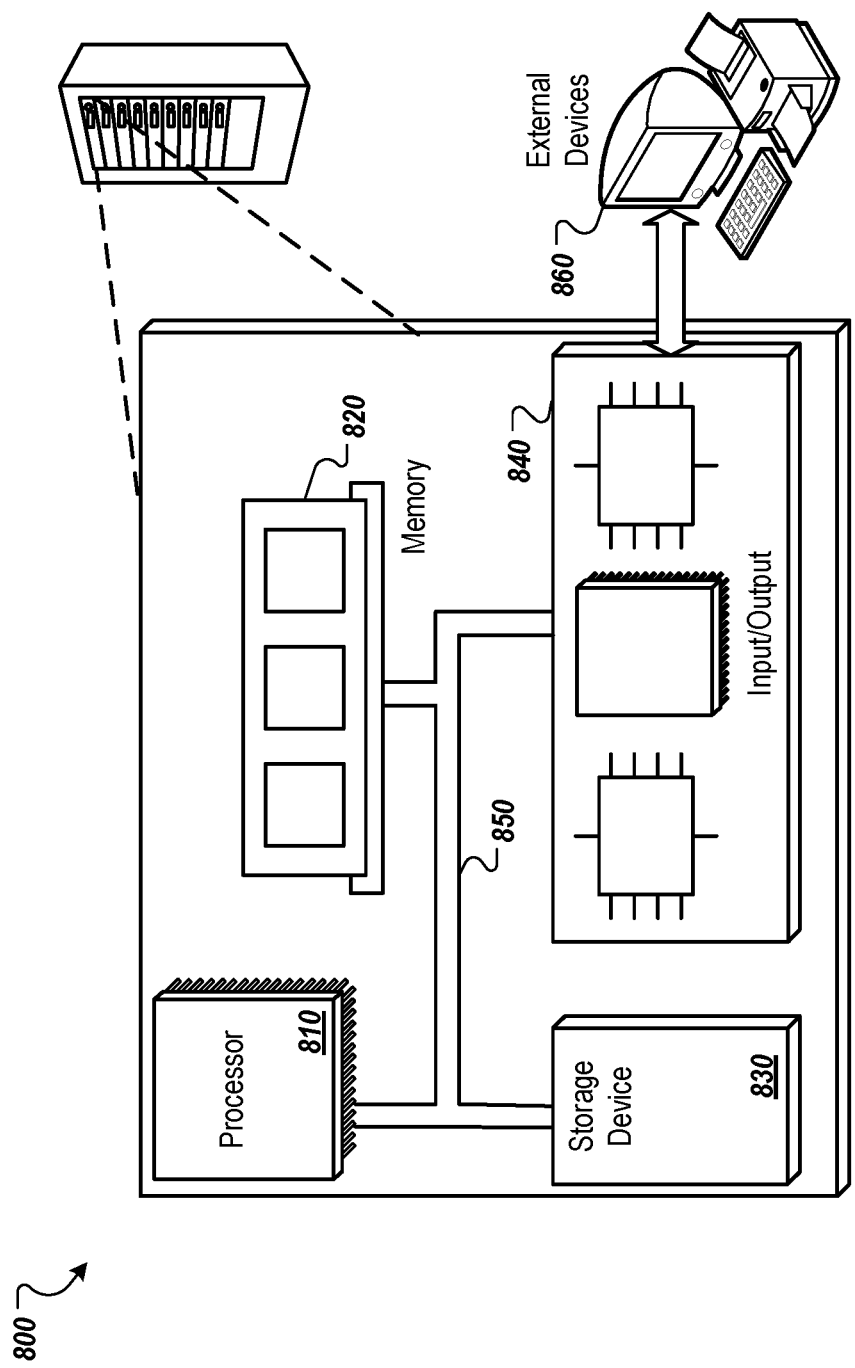
FIG. 8 is a block diagram of an example computer system.

FIG. 8 is a block diagram of an example computer system 800 that can be used to perform operations described above. The system 800 includes a processor 810, a memory 820, a storage device 830, and an input/output device 840. Each of the components 810, 820, 830, and 840 can be interconnected, for example, using a system bus 850. The processor 810 is capable of processing instructions for execution within the system 800. In some implementations, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In some implementations, the memory 820 is a volatile memory unit. In another implementation, the memory 820 is a non-volatile memory unit.

The storage device 830 is capable of providing mass storage for the system 800. In some implementations, the storage device 830 is a computer-readable medium. In various different implementations, the storage device 830 can include, for example, a hard disk device, an optical disk device, a storage device that is shared over a network by multiple computing devices (e.g., a cloud storage device), or some other large capacity storage device.

The input/output device 840 provides input/output operations for the system 800. In some implementations, the input/output device 840 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 860, e.g., keyboard, printer and display devices. Other implementations, however, can also be used, such as mobile computing devices, mobile communication devices, set-top box television client devices, etc.

Although an example processing system has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method, comprising:
   receiving, from a client device and by a first computing system of a plurality of multi-party computation (MPC) systems, a first request for user group identifiers that identify user groups to which to add a user, the first request comprising a model identifier for a centroid model, first user profile data for a user profile of the user, and a threshold distance;
   identifying a set of user groups corresponding to the model identifier;
   identifying, for each user group in the set of user groups, a centroid for the user group determined using a centroid model corresponding to the model identifier;
   determining, by the first computing system, a user group result based at least on the first user profile data, the centroid for each user group in the set of user groups, and the threshold distance, wherein the user group result is indicative of one or more user groups to which to add the user; and
   transmitting the user group result to the client device.

2. The computer-implemented method of claim 1, wherein the first user profile data includes a first portion of the user profile and wherein the centroid for each user group is determined using a secure MPC process between the first computing system and one or more second computing systems of the plurality of MPC systems.

3. The computer-implemented method of claim 2, wherein the user group result comprises the one or more user group identifiers of the one or more user groups and wherein each second computing system transmits, to the client device, a second user group result that includes one or more second user group identifiers of one of one or more second user groups to which to add the user determined based on a respective second portion of the user profile, a respective second centroid for each user group in the set of user groups, and the threshold distance.

4. The computer-implemented method of claim 1, further comprising generating the centroid for each user group in the set of user groups, the generating comprising:
   obtaining a data structure comprising, for each centroid model and user group identifier pair, a first sum of shares vector representing a sum of first shares of a set of user profiles and a number of client devices from which the first shares of the set of user profiles was received;
   determining, for each centroid model and user group identifier pair, whether the number of client devices satisfies the threshold;
   for each centroid model and user group identifier pair for which the number of client devices satisfies the threshold, transmitting a first portion of the first sum of shares vector for the centroid model and user group identifier pair to each of one or more second computing systems of the plurality of MPC systems;
   receiving, from each of the one or more second computing systems a portion of a respective second sum of shares vector for one or more centroid model and user group identifier pairs; and
   for each of the one or more centroid model and user group identifier pairs:
      determining a sum of each portion of the respective second sum of shares vector for the centroid model and user group identifier pair and a portion of the first sum of shares vector for the centroid model and user group identifier pair; and
      determining the centroid of a user group identifier by the user group identifier based on the sum.

5. The computer-implemented method of claim 4, wherein determining the centroid of a user group identified by the user group identifier based on the sum comprises dividing the sum by a sum of (i) the number of client devices for the centroid model and user group identifier pair and (ii) a respective number of client devices for the centroid model and user group identifier pair received from each second computing system.

6. The computer-implemented method of claim 1, wherein the first user profile data for the user profile comprises a first secret share of the user profile, the method further comprising, for each centroid model and user group identifier pair:
   determining, based on a random or pseudorandom seed received from the client device, a first number having a value of zero or one and that represents a first secret share of an estimate by an application of the client device of whether the user is to be added to the user group identified by the user group identifier; and
   deriving a first secret share of an estimation flag indicating whether the application estimated whether the user is to be added to the user group correctly by performing a first round of a secure MPC process with one or more second computing systems of the plurality of MPC systems using at least the first secret share of the user profile, the first number, a respective second secret share of the user profile received by each second computing system, and a respective second number received by each second computing system.

7. The computer-implemented method of claim 6, further comprising performing a second round of the secure MPC process with the one or more second computing systems to reconstruct the estimation flag based on the first secret share of the estimation flag and a respective second secret share of the estimation flag derived by each of the one or more second computing systems.

8. The computer-implemented method of claim 7, wherein the user group result comprises the estimation flag for each centroid model and user group identifier pair.

9. The computer-implemented method of claim 8, further comprising receiving a first request for one or more user group identifiers corresponding to one or more of the estimation flags, wherein the request comprises a distributed point function for each estimation flag.

10. The computer-implemented method of claim 9, further comprising deriving a first user group identifier result for each estimation flag using the user group identifier corresponding to the estimation flag and the distributed point function for the estimation flag, wherein the client device determines the user group identifier corresponding to the estimation flag using the first user group identifier result and a respective second user group identifier result received from each second computing system of the plurality of MPC systems.

11. A system comprising:
one or more processors; and
one or more storage devices storing instructions that, when executed by the one or more processors, cause the one or more processors to perform operations comprising:
receiving, from a client device and by a first computing system of a plurality of multi-party computation (MPC) systems, a first request for user group identifiers that identify user groups to which to add a user, the first request comprising a model identifier for a centroid model, first user profile data for a user profile of the user, and a threshold distance;
identifying a set of user groups corresponding to the model identifier;
identifying, for each user group in the set of user groups, a centroid for the user group determined using a centroid model corresponding to the model identifier;
determining, by the first computing system, a user group result based at least on the first user profile data, the centroid for each user group in the set of user groups, and the threshold distance, wherein the user group result is indicative of one or more user groups to which to add the user; and
transmitting the user group result to the client device.

12. The system of claim 11, wherein the first user profile data includes a first portion of the user profile and wherein the centroid for each user group is determined using a secure MPC process between the first computing system and one or more second computing systems of the plurality of MPC systems.

13. The system of claim 12, wherein the user group result comprises the one or more user group identifiers of the one or more user groups and wherein each second computing system transmits, to the client device, a second user group result that includes one or more second user group identifiers of one of one or more second user groups to which to add the user determined based on a respective second portion of the user profile, a respective second centroid for each user group in the set of user groups, and the threshold distance.

14. The system of claim 11, wherein the operations comprise generating the centroid for each user group in the set of user groups, the generating comprising:
obtaining a data structure comprising, for each centroid model and user group identifier pair, a first sum of shares vector representing a sum of first shares of a set of user profiles and a number of client devices from which the first shares of the set of user profiles was received;
determining, for each centroid model and user group identifier pair, whether the number of client devices satisfies the threshold;
for each centroid model and user group identifier pair for which the number of client devices satisfies the threshold, transmitting a first portion of the first sum of shares vector for the centroid model and user group identifier pair to each of one or more second computing systems of the plurality of MPC systems;
receiving, from each of the one or more second computing systems a portion of a respective second sum of shares vector for one or more centroid model and user group identifier pairs; and
for each of the one or more centroid model and user group identifier pairs:
determining a sum of each portion of the respective second sum of shares vector for the centroid model and user group identifier pair and a portion of the first sum of shares vector for the centroid model and user group identifier pair; and
determining the centroid of a user group identifier by the user group identifier based on the sum.

15. The system of claim 14, wherein determining the centroid of a user group identified by the user group identifier based on the sum comprises dividing the sum by a sum of (i) the number of client devices for the centroid model and user group identifier pair and (ii) a respective number of client devices for the centroid model and user group identifier pair received from each second computing system.

16. The system of claim 11, wherein the first user profile data for the user profile comprises a first secret share of the user profile, the operations further comprising, for each centroid model and user group identifier pair:
determining, based on a random or pseudorandom seed received from the client device, a first number having a value of zero or one and that represents a first secret share of an estimate by an application of the client device of whether the user is to be added to the user group identified by the user group identifier; and
deriving a first secret share of an estimation flag indicating whether the application estimated whether the user is to be added to the user group correctly by performing a first round of a secure MPC process with one or more second computing systems of the plurality of MPC systems using at least the first secret share of the user profile, the first number, a respective second secret share of the user profile received by each second computing system, and a respective second number received by each second computing system.

17. The system of claim 16, wherein the operations comprise performing a second round of the secure MPC process with the one or more second computing systems to reconstruct the estimation flag based on the first secret share of the estimation flag and a respective second secret share of the estimation flag derived by each of the one or more second computing systems.

18. The system of claim 17, wherein the user group result comprises the estimation flag for each centroid model and user group identifier pair.

19. The system of claim 18, wherein the operations comprise receiving a first request for one or more user group identifiers corresponding to one or more of the estimation flags, wherein the request comprises a distributed point function for each estimation flag.

20. A non-transitory computer readable storage medium carrying instructions that, when executed by one or more processors, cause the one or more processors to perform operations comprising:
receiving, from a client device and by a first computing system of a plurality of multi-party computation (MPC) systems, a first request for user group identifiers that identify user groups to which to add a user, the first request comprising a model identifier for a centroid model, first user profile data for a user profile of the user, and a threshold distance;

identifying a set of user groups corresponding to the model identifier;

identifying, for each user group in the set of user groups, a centroid for the user group determined using a centroid model corresponding to the model identifier;

determining, by the first computing system, a user group result based at least on the first user profile data, the centroid for each user group in the set of user groups, and the threshold distance, wherein the user group result is indicative of one or more user groups to which to add the user; and transmitting the user group result to the client device.

* * * * *